US012411308B2

(12) United States Patent
Huang et al.

(10) Patent No.: US 12,411,308 B2
(45) Date of Patent: Sep. 9, 2025

(54) OPTICAL LENS ASSEMBLY AND PHOTOGRAPHING MODULE

(71) Applicant: NEWMAX TECHNOLOGY CO., LTD., Taichung (TW)

(72) Inventors: Ching-Yun Huang, Taichung (TW); Chia-Wei Liao, Taichung (TW); Chun-Sheng Lee, Taichung (TW)

( * ) Notice: Subject to any disclaimer, the term of this patent is extended or adjusted under 35 U.S.C. 154(b) by 373 days.

(21) Appl. No.: 18/202,945

(22) Filed: May 28, 2023

(65) Prior Publication Data

US 2024/0310604 A1 Sep. 19, 2024

(30) Foreign Application Priority Data

Mar. 17, 2023 (TW) .................................. 112109919

(51) Int. Cl.
| G02B 9/62 | (2006.01) |
| G02B 7/02 | (2021.01) |
| G02B 13/00 | (2006.01) |
| G02B 13/06 | (2006.01) |
| G02B 27/00 | (2006.01) |

(52) U.S. Cl.
CPC ............... G02B 9/62 (2013.01); G02B 7/028 (2013.01); G02B 13/0045 (2013.01); G02B 13/06 (2013.01); G02B 7/021 (2013.01); G02B 27/0018 (2013.01)

(58) Field of Classification Search
CPC ......... G02B 9/62; G02B 9/64; G02B 13/0045

USPC ......................................... 359/761, 713, 755
See application file for complete search history.

(56) References Cited

U.S. PATENT DOCUMENTS

| 2018/0314039 A1* | 11/2018 | Dai ......................... G02B 9/64 |
| 2020/0081240 A1* | 3/2020 | Kamo ....................... A61B 1/05 |
| 2020/0166733 A1* | 5/2020 | Xie ..................... G02B 13/006 |
| 2022/0091381 A1* | 3/2022 | Dou ....................... G02B 13/04 |
| 2022/0206253 A1* | 6/2022 | Li ...................... G02B 13/0045 |
| 2025/0147282 A1* | 5/2025 | Chen ........................ G02B 9/62 |

* cited by examiner

Primary Examiner — Bumsuk Won
Assistant Examiner — Seth D Moser
(74) Attorney, Agent, or Firm — Bruce Stone LLP; Joseph A. Bruce

(57) ABSTRACT

An optical lens assembly includes, in order from an object side to an image side: a first lens with negative refractive power; a second lens with positive refractive power; a third lens with positive refractive power; a fourth lens with positive refractive power; a fifth lens with negative refractive power; a sixth lens with positive refractive power; wherein a chief ray angle incident on an image plane at a maximum view angle of the optical lens assembly is CRA, a distance from the image-side surface of the sixth lens to the image plane along an optical axis is BFL, a focal length of the optical lens assembly is f, and the following condition is satisfied:

$$0.54°/mm^2 < CRA/*BFL*f) < 17.33/mm^2.$$

20 Claims, 14 Drawing Sheets

OPTICAL LENS ASSEMBLY AND PHOTOGRAPHING MODULE

BACKGROUND

Field of the Invention

The present invention relates to an optical lens assembly and a photographing module, and more particularly to an optical lens assembly and a photographing module applicable to electronic products.

Description of Related Art

Small camera lens devices can be widely used in various electronic devices, such as, wearable display, smart phone, tablet computer, game player, dashcam, household electronic device, surveillance camera and so on. With the emergence of Internet of Things (IoT), the demand for the Internet of Things devices is also increasing Therefore, how to develop a small camera lens device to have a large field of view, be workable in both the visible and infrared light bands, and adapt to a large temperature range while being applied to Internet of Things devices is the motivation of the present invention.

The present invention mitigates and/or obviates the aforementioned disadvantages.

SUMMARY

The objective of the present invention is to provide an optical lens assembly and a photographing module, and the optical lens assembly has a total of six lenses with refractive power. When a specific condition is satisfied, the optical lens assembly has the image quality with high image resolution in both visible and infrared light bands, and can achieve ultra-wide field of view and reduce the influence of ambient temperature on image quality.

In addition, when the lens is made of glass, the optical lens assembly of the present invention can be used at more extreme temperatures.

Therefore, an optical lens assembly in accordance with the present invention includes, in order from an object side to an image side: a first lens with negative refractive power, including an object-side surface and an image-side surface, the object-side surface of the first lens being concave in a paraxial region thereof, and the image-side surface of the first lens being concave in a paraxial region thereof; a second lens with positive refractive power, including an object-side surface and an image-side surface, the object-side surface of the second lens being concave in a paraxial region thereof, and the image-side surface of the second lens being convex in a paraxial region thereof; a third lens with positive refractive power, including an object-side surface and an image-side surface, the object-side surface of the third lens being concave in a paraxial region thereof, and the image-side surface of the third lens being convex in a paraxial region thereof; a fourth lens with positive refractive power, including an object-side surface and an image-side surface, the object-side surface of the fourth lens being convex in a paraxial region thereof, and the image-side surface of the fourth lens being convex in a paraxial region thereof; a fifth lens with negative refractive power, including an object-side surface and an image-side surface, the object-side surface of the fifth lens being concave in a paraxial region thereof, and the image-side surface of the fifth lens being concave in a paraxial region thereof; and a sixth lens with positive refractive power, including an object-side surface and an image-side surface, and the object-side surface of the sixth lens being convex in a paraxial region thereof.

Wherein a chief ray angle incident on an image plane at a maximum view angle of the optical lens assembly is CRA, a distance from the image-side surface of the sixth lens to the image plane along the optical axis is BFL, a focal length of the optical lens assembly is f, and the following condition is satisfied:

$$0.54°/mm^2 < CRA/(BFL*f) < 17.33/mm^2.$$

The optical lens assembly has a total of six lenses with refractive power.

The present invention has the following effect. When $0.54°/mm^2 < CRA/(BFL*f) < 17.33°/mm^2$ is satisfied, the incident angle of the chief ray, the rear focal space and the ratio of the focal length of the system are more appropriate, which can provide better relative illumination and meet the rear focal requirements of the module. Optionally, the following condition is satisfied: $8.85°/mm^2 < CRA/(BFL*f) < 13.88°/mm^2$. When the third lens is made of glass, the optical lens assembly of the present invention can be used at more extreme temperatures.

A radius of curvature of the object-side surface of the third lens is R5, a radius of curvature of the image-side surface of the third lens is R6, and the following condition is satisfied: $1.07 < R5/R6 < 3.56$, so that the ratio of the curvatures of the third lenses is better to reduce the difficulty in manufacturing glass lenses. Optionally, the following condition is satisfied:

$$1.48 < R5/R6 < 2.63.$$

The radius of curvature of the object-side surface of the third lens is R5, the radius of curvature of the image-side surface of the third lens is R6, a focal length of the third lens is f3, a thickness of the third lens along the optical axis is CT3, and the following condition is satisfied: $0.88 < (R5*R6)/(f3*CT3) < 11.25$, so that the proportion of glass lens parameters of the third lens is better to improve the glass manufacturability and reduce the temperature drift problem of the optical lens assembly. Optionally, the following condition is satisfied.

$$2.24 < (R5*R6)/(f3*CT3) < 9.17.$$

A focal length of the sixth lens is f6, a radius of curvature of the object-side surface of the sixth lens is R11, and the following condition is satisfied: $0.89 < f6/R11 < 4.35$, so that the curvature and refractive power design of the sixth lens are better to improve the image quality of the optical lens assembly and reduce the lens sensitivity. Optionally, the following condition is satisfied:

$$1.68 < f6/R11 < 4.35.$$

A distance from the object-side surface of the first lens to the image plane along the optical axis is TL, the distance from the image-side surface of the sixth lens to the image plane along the optical axis is BFL, a maximum image height of the optical lens assembly is IMH, and the following condition is satisfied: 3.74<(TL-BFL)/IMH<6.84, so that the module height, the rear focal space and the aspect ratio of the image are better to achieve the optimal module height and imaging size requirements. Optionally, the following condition is satisfied:

$$4.13 < (TL - BFL)/IMH < 6.34.$$

A maximum field of view of the optical lens assembly is FOV, the chief ray angle incident on the image plane at the maximum view angle of the optical lens assembly is CRA, and the following condition is satisfied: 4.23<FOV/CRA<13.32, so that the cooperation of the incident angle of the chief ray and the ultra-wide field of view characteristic is better to reduce the aberration of the optical lens assembly. Optionally, the following condition is satisfied:

$$4.23 < FOV/CRA < 6.36.$$

A radius of curvature of the image-side surface of the fifth lens is R10, the radius of curvature of the object-side surface of the sixth lens is R11, and the following condition is satisfied: 0.67<R10/R11<7.20, so that the proportion of refractive power of the lenses is better to reduce the ghost problem between the lenses. Optionally, the following condition is satisfied:

$$0.98 < R10/R11 < 7.20.$$

The chief ray angle incident on the image plane at the maximum view angle of the optical lens assembly is CRA, the distance from the image-side surface of the sixth lens to the image plane along the optical axis is BFL, the maximum image height of the optical lens assembly is IMH, and the following condition is satisfied: 0.27<tan(CRA)*BFL/IMH<0.47, so that the proportion of the optical lens assembly is better to meet the rear focal space and image sensor imaging size and the incident angle requirements. Optionally, the following condition is satisfied:

$$0.29 < \tan(CRA) * BFL/IMH < 0.46.$$

An Abbe number of the third lens is vd3, a refractive index of the third lens is nd3, the focal length of the third lens is f3, the thickness of the third lens along the optical axis is CT3, and the following condition is satisfied: 0.87 mm$^{-2}$<vd3/(nd3*f3*CT3)<5.74 mm$^{-2}$, so that the lens material, refractive power and thickness design ratio of the third lens is better to provide better glass lens manufacturability. Optionally, the following condition is satisfied:

$$1.61 \text{ mm}^{-2} < vd3/(nd3 * f3 * CT3) < 4.02 \text{ mm}^{-2}.$$

The focal length of the optical lens assembly is f, a focal length of the first lens is f1, and the following condition is satisfied: −0.68<f/f1<−0.34, so that the ratio of the focal length of the first lens to that of the optical lens assembly can enhance the wide-field of view characteristic of the optical lens assembly, so as to provide a larger field of view. Optionally, the following condition is satisfied:

$$0.58 < f/f1 < -0.38.$$

A focal length of the fourth lens is f4, a focal length of the fifth lens is f5, and the following condition is satisfied: −2.24<f4/f5<−0.77, so that the distribution of the refractive power of the optical lens assembly is be more appropriate, which is favorable to correcting the aberration of the optical lens assembly for the enhancement of the image quality. Optionally, the following condition is satisfied:

$$-1.59 < f4/f5 < -0.77.$$

The focal length of the fourth lens is f4, the focal length of the fifth lens is f5, a radius of curvature of the image-side surface of the fourth lens is R8, a radius of curvature of the object-side surface of the fifth lens is R9, and the following condition is satisfied: −1.71<f4*R8/(R9*f5)<−0.66, so that the curvature and refractive power design of the optical lens assembly are better to improve the confocal properties of the visible and infrared light bands. Optionally, the following condition is satisfied:

$$-1.35 < f4 * R8/(R9 * f5) < -0.73.$$

The distance from the object-side surface of the first lens to the image plane along the optical axis is TL, the maximum image height of the optical lens assembly is IMH, the focal length of the optical lens assembly is f, and the following condition is satisfied: 1.59 mm$^{-1}$<TL/(IMH*f)<5.84 mm$^{-1}$, so that the module height, the image height and the refractive power ratio of the optical lens assembly are better to achieve the optimum imaging effects. Optionally, the following condition is satisfied:

$$2.94 \text{ mm}^{-1} < TL/(IMH * f) < 4.47 \text{ mm}^{-1}.$$

A focal length of the second lens is f2, the focal length of the third lens is f3, and the following condition is satisfied: 0.74<f2/f3<4.70, so that the proportion of the refractive power ratio of the lenses of the optical lens assembly is better to reduce the temperature drift problem. Optionally, the following condition is satisfied:

$$1.04 < f2/f3 < 3.25.$$

The radius of curvature of the image-side surface of the fourth lens is R8, the radius of curvature of the object-side surface of the fifth lens is R9, a distance from the fourth lens to the fifth lens along the optical axis is T45, and the following condition is satisfied: 2.21 mm$^{-1}$<(R8/R9)/T45<15.14 mm$^{-1}$, so that the proportion of the refractive power and interval of the lenses of the optical lens assembly is better to reduce the ghost problem between the lenses. Optionally, the following condition is satisfied:

$$6.15 \text{ mm}^{-1} < (R8/R9)/T45 < 15.14 \text{ mm}^{-1}.$$

A thickness of the fourth lens along the optical axis is CT4, a thickness of the fifth lens along the optical axis is CT5, a thickness of the sixth lens along the optical axis is CT6, the focal length of the fifth lens is f5, and the following condition is satisfied: $-3.28 \text{ mm}^{-1} < (CT4+CT6)/(CT5*f5) < -0.71 \text{ mm}^{-1}$, so that the thicknesses and refractive powers of the lenses are better to enhance the image quality and reduce the lens tolerance. Optionally, the following condition is satisfied:

$$-1.23 \text{ mm}^{-1} < (CT4 + CT6)/(CT5*f5) < -0.71 \text{ mm}^{-1}.$$

The focal length of the fifth lens is f5, the focal length of the sixth lens is f6, and the following condition is satisfied: $-12.96 \text{ mm} < f5*f6/f < -5.07 \text{ mm}$, so that the distribution of the refractive power of the lenses of the optical lens assembly is better, and the optical lens assembly can be applied in both the visible and infrared light bands.

Moreover, a photographing module in accordance with the present invention includes a lens barrel, the aforementioned optical lens assembly disposed in the lens barrel, and an image sensor disposed on the image plane of the optical lens assembly.

The present invention will be presented in further details from the following descriptions with the accompanying drawings, which show, for purpose of illustrations only, the preferred embodiments in accordance with the present invention.

DETAILED DESCRIPTION

First Embodiment

Figure 1A:
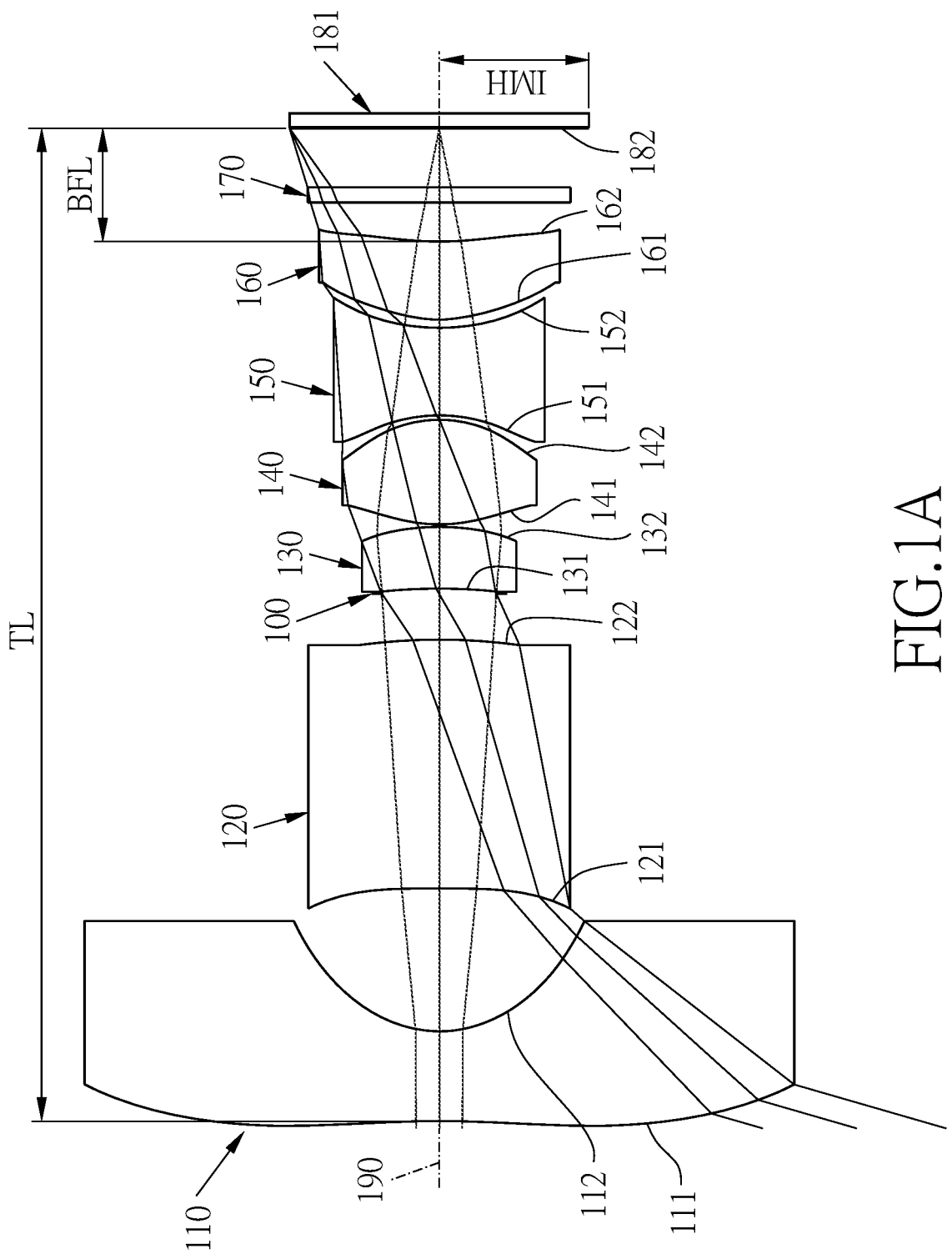
FIG. 1A is a schematic view of an optical lens assembly in accordance with a first embodiment of the present invention.
Figure 1B:
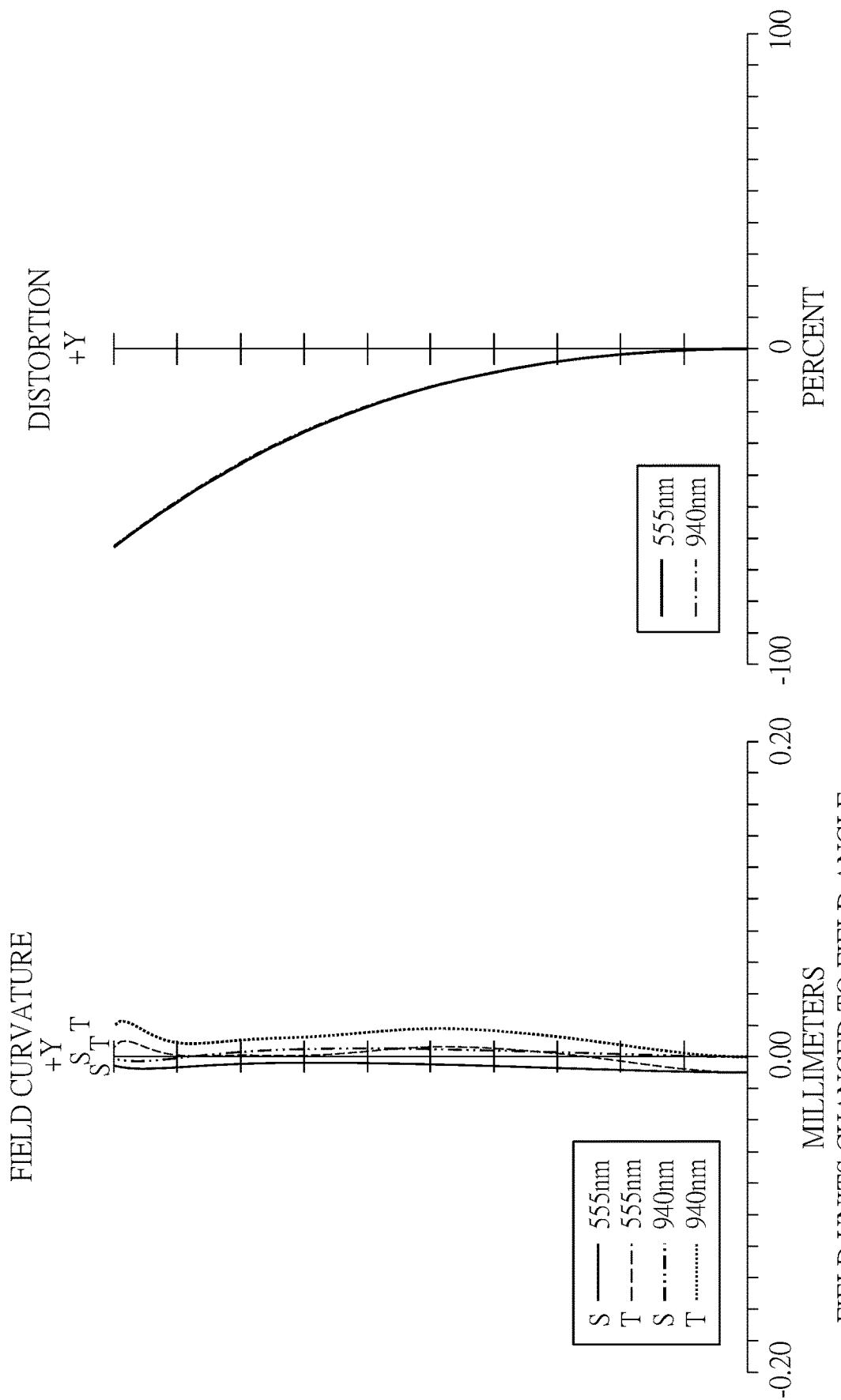
FIG. 1B is a schematic diagram showing, in order from left to right, the field curvature curve and the distortion curve of the first embodiment of the present invention, which illustrate the states of the field curvature curve and the distortion curve in both visible and infrared light bands.
Figure 1C:
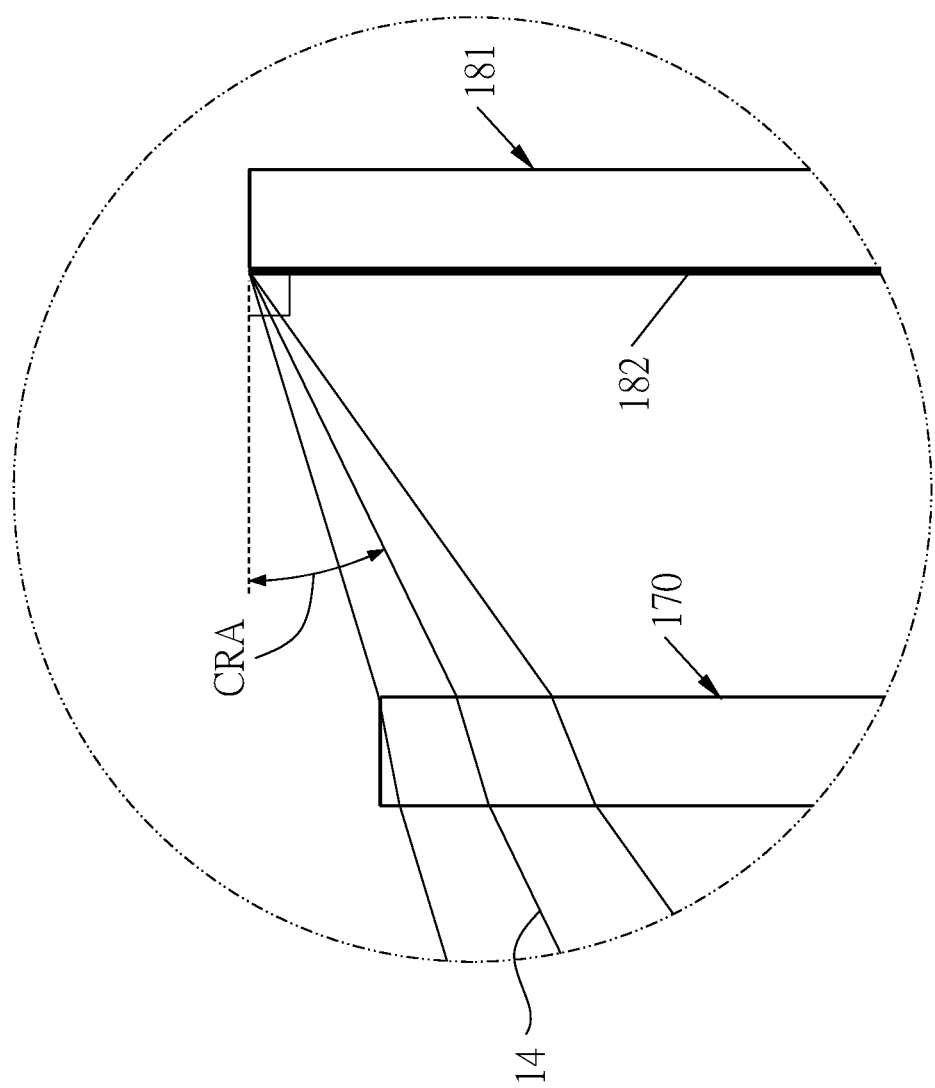
FIG. 1C is a schematic view of parameter CRA in accordance with a first embodiment of the present invention.

Referring to FIGS. 1A, 1B and 1C, FIG. 1A shows a schematic view of an optical lens assembly in accordance with a first embodiment of the present invention, FIG. 1B shows, in order from left to right, the field curvature curve and the distortion curve of the first embodiment of the present invention, which illustrate the states of the field curvature curve and the distortion curve in both visible and infrared light bands, and FIG. 1C is a schematic view of parameter CRA in accordance with a first embodiment of the present invention. As shown in FIG. 1A, the optical lens assembly includes, in order from an object side to an image side along an optical axis 190: a first lens 110, a second lens 120, a stop 100, a third lens 130, a fourth lens 140, a fifth lens 150, a sixth lens 160, an optical filter 170, and an image plane 182. The optical lens assembly can cooperate with an image sensor 181 disposed on an image plane 182. The optical lens assembly has a total of six lenses with refractive power, but not is limited thereto.

The first lens 110 with negative refractive power includes an object-side surface 111 and an image-side surface 112, the object-side surface 111 of the first lens 110 is concave in a paraxial region thereof, the image-side surface 112 of the first lens 110 is concave in a paraxial region thereof, the object-side surface 111 and the image-side surface 112 of the first lens 110 are aspheric, and the first lens 110 is made of plastic.

The second lens 120 with positive refractive power includes an object-side surface 121 and an image-side surface 122, the object-side surface 121 of the second lens 120 is concave in a paraxial region thereof, the image-side surface 122 of the second lens 120 is convex in a paraxial region thereof, the object-side surface 121 and the image-side surface 122 of the second lens 120 are aspheric, and the second lens 120 is made of plastic.

The third lens 130 with positive refractive power includes an object-side surface 131 and an image-side surface 132, the object-side surface 131 of the third lens 130 is concave in a paraxial region thereof, the image-side surface 132 of the third lens 130 is convex in a paraxial region thereof, the object-side surface 131 and the image-side surface 132 of the third lens 130 are aspheric, and the third lens 130 is made of glass.

The fourth lens 140 with positive refractive power includes an object-side surface 141 and an image-side surface 142, the object-side surface 141 of the fourth lens 140 is convex in a paraxial region thereof, the image-side surface 142 of the fourth lens 140 is convex in a paraxial region thereof, the object-side surface 141 and the image-side surface 142 of the fourth lens 140 are aspheric, and the fourth lens 140 is made of plastic.

The fifth lens 150 with negative refractive power includes an object-side surface 151 and an image-side surface 152, the object-side surface 151 of the fifth lens 150 is concave in a paraxial region thereof, the image-side surface 152 of the fifth lens 150 is concave in a paraxial region thereof, the object-side surface 151 and the image-side surface 152 of the fifth lens 150 are aspheric, and the fifth lens 150 is made of plastic.

The sixth lens 160 with positive refractive power includes an object-side surface 161 and an image-side surface 162, the object-side surface 161 of the sixth lens 160 is convex in a paraxial region thereof, the image-side surface 162 of the sixth lens 160 is concave in a paraxial region thereof, the object-side surface 161 and the image-side surface 162 of the sixth lens 160 are aspheric, and the sixth lens 160 is made of plastic.

The optical filter 170 is made of glass, is located between the sixth lens 160 and the image plane 182, and has no influence on the focal length of the optical lens assembly. In the present embodiment, the optical filter 170 is selected from filters that allow light in the visible light wavelengths, in the infrared light wavelengths or in both the visible and infrared light wavelengths to pass therethrough.

The curve equation for the aspheric surface profiles of the respective lenses of the first embodiment is expressed as follows:

$$z(h) = \frac{ch^2}{1 + [1 - (k+1)c^2h^2]^{0.5}} + \sum (A_i) \cdot (h^i)$$

wherein:
- z represents the value of a reference position at a height of h with respect to a vertex of the surface of a lens along the optical axis 190;
- c represents a paraxial curvature (i.e., a curvature of a lens surface in a paraxial region thereof) equal to 1/R (R: a paraxial radius of curvature);
- h represents a vertical distance from the point on the curve of the aspheric surface to the optical axis 190;
- k represents the conic constant; and
- $A_i$ represents the i-th order aspheric coefficient.

In the first embodiment of the optical lens assembly, a focal length of the optical lens assembly is f, a f-number of the optical lens assembly is Fno, a maximum field of view of the optical lens assembly is FOV, an entrance pupil diameter of the optical lens assembly is EPD, and their values are expressed as follows: f=1.60 mm; Fno=2.20; FOV=151.0 degrees; and EPD=0.71 mm.

In the first embodiment of the optical lens assembly, a chief ray 14 angle incident on the image plane 182 at a maximum view angle of the optical lens assembly is CRA (as shown in FIG. 1C), a distance from the image-side surface 162 of the sixth lens 160 to the image plane 182 along the optical axis 190 is BFL, the focal length of the optical lens assembly is f, and the following condition is satisfied:

$$CRA/(BFL*f) = 11.39°/mm^2.$$

In the first embodiment of the optical lens assembly, a radius of curvature of the object-side surface 131 of the third lens 130 is R5, a radius of curvature of the image-side surface 132 of the third lens 130 is R6, and the following condition is satisfied:

$$R5/R6 = 2.19.$$

In the first embodiment of the optical lens assembly, the radius of curvature of the object-side surface 131 of the third lens 130 is R5, the radius of curvature of the image-side surface 132 of the third lens 130 is R6, a focal length of the third lens 130 is f3, a central thickness of the third lens 130 along the optical axis 190 is CT3, and the following condition is satisfied:

$$(R5*R6)/(f3*CT3) = 5.16.$$

In the first embodiment of the optical lens assembly, a focal length of the sixth lens 160 is f6, a radius of curvature of the object-side surface 161 of the sixth lens 160 is R11, and the following condition is satisfied:

$$f6/R11 = 2.84.$$

In the first embodiment of the optical lens assembly, a distance from the object-side surface 111 of the first lens 110 to the image plane 182 along the optical axis 190 is TL, the distance from the image-side surface 162 of the sixth lens 160 to the image plane 182 along the optical axis 190 is BFL, a maximum image height of the optical lens assembly is IMH, and the following condition is satisfied:

$$(TL - BFL)/IMH = 5.27.$$

In the first embodiment of the optical lens assembly, the maximum field of view of the optical lens assembly is FOV, the chief ray 14 angle incident on the image plane 182 at the maximum view angle of the optical lens assembly is CRA, and the following condition is satisfied:

$$FOV/CRA = 5.28.$$

In the first embodiment of the optical lens assembly, a radius of curvature of the image-side surface 152 of the fifth lens 150 is R10, the radius of curvature of the object-side surface 161 of the sixth lens 160 is R11, and the following condition is satisfied:

$$R10/R11 = 1.64.$$

In the first embodiment of the optical lens assembly, the chief ray 14 angle incident on the image plane 182 at the maximum view angle of the optical lens assembly is CRA, the distance from the image-side surface 162 of the sixth lens 160 to the image plane 182 along the optical axis 190 is BFL, the maximum image height of the optical lens assembly is IMH, and the following condition is satisfied:

$$\tan(CRA) * BFL/IMH = 0.37.$$

In the first embodiment of the optical lens assembly, an Abbe number of the third lens 130 is vd3, a refractive index of the third lens is nd3, the focal length of the third lens 130 is f3, the central thickness of the third lens 130 along the optical axis 190 is CT3, and the following condition is satisfied:

$$vd3/(nd3 * f3 * CT3) = 2.98 \text{ mm}^{-2}.$$

In the first embodiment of the optical lens assembly, the focal length of the optical lens assembly is f, a focal length of the first lens 110 is f1, and the following condition is satisfied:

$$f/f1 = -0.48.$$

In the first embodiment of the optical lens assembly, a focal length of the fourth lens 140 is f4, a focal length of the fifth lens 150 is f5, and the following condition is satisfied:

$$f4/f5 = -1.14.$$

In the first embodiment of the optical lens assembly, the focal length of the fourth lens 140 is f4, the focal length of the fifth lens 150 is f5, a radius of curvature of the image-side surface 142 of the fourth lens 140 is R8, a radius of curvature of an object-side surface 151 of the fifth lens 150 is R9, and the following condition is satisfied:

$$f4 * R8/(R9 * f5) = -0.92.$$

In the first embodiment of the optical lens assembly, the distance from the object-side surface 111 of the first lens 110 to the image plane 182 along the optical axis 190 is TL, the maximum image height of the optical lens assembly is IMH, the focal length of the optical lens assembly is f, and the following condition is satisfied:

$$TL/(IMH * f) = 3.72 \text{ mm}^{-1}.$$

In the first embodiment of the optical lens assembly, the focal length of the second lens 120 is f2, the focal length of the third lens 130 is f3, and the following condition is satisfied:

$$f2/f3 = 2.08.$$

In the first embodiment of the optical lens assembly, the radius of curvature of the image-side surface 142 of the fourth lens 140 is R8, the radius of curvature of an object-side surface 151 of the fifth lens 150 is R9, a distance from the fourth lens 140 to the fifth lens 150 along the optical axis 190 is T45, and the following condition is satisfied:

$$(R8/R9)/T45 = 12.62 \text{ mm}^{-1}.$$

In the first embodiment of the optical lens assembly, a central thickness of the fourth lens 140 along the optical axis 190 is CT4, a central thickness of the fifth lens 150 along the optical axis 190 is CT5, a central thickness of the sixth lens 160 along the optical axis 190 is CT6, the focal length of the fifth lens 150 is f5, and the following condition is satisfied:

$$(CT4 + CT6)/(CT5 * f5) = -0.94 \text{ mm}^{-1}.$$

In the first embodiment of the optical lens assembly, the focal length of the fifth lens 150 is f5, the focal length of the sixth lens 160 is f6, the focal length of the optical lens assembly is f, and the following condition is satisfied:

$$f5 * f6/f = -9.02 \text{ mm}.$$

The detailed optical data of the respective elements in the optical lens assembly of the first embodiment is shown in Table 1, and the aspheric coefficients of the lenses in the first embodiment is shown in Table 2.

TABLE 1

Embodiment 1
f = 1.60 mm, Fno = 2.20, FOV = 151.0°

| Surface | | Radius of curvature | | Thickness/gap | Material | Refractive index (nd) | Abbe number (vd) | Focal length |
|---|---|---|---|---|---|---|---|---|
| 0 | Object | Infinity | | Infinity | | | | |
| 1 | First lens | −18.032 | (ASP) | 1.236 | plastic | 1.544 | 56.0 | −3.33 |
| 2 | | 2.068 | (ASP) | 1.978 | | | | |
| 3 | Second lens | −47.658 | (ASP) | 3.447 | plastic | 1.661 | 20.4 | 18.51 |
| 4 | | −10.084 | (ASP) | 0.636 | | | | |
| 5 | Stop | Infinity | | 0.070 | | | | |
| 6 | Third lens | −9.263 | (ASP) | 0.854 | glass | 1.806 | 40.7 | 8.89 |
| 7 | | −4.231 | (ASP) | 0.035 | | | | |
| 8 | Fourth lens | 2.821 | (ASP) | 1.443 | plastic | 1.544 | 56.0 | 2.54 |
| 9 | | −2.228 | (ASP) | 0.064 | | | | |
| 10 | Fifth lens | −2.777 | (ASP) | 1.208 | plastic | 1.661 | 20.4 | −2.22 |
| 11 | | 3.731 | (ASP) | 0.114 | | | | |
| 12 | Sixth lens | 2.280 | (ASP) | 1.077 | plastic | 1.544 | 56.0 | 6.48 |
| 13 | | 5.347 | (ASP) | 0.547 | | | | |
| 14 | Optical filter | Infinity | | 0.210 | glass | 1.517 | 64.2 | |
| 15 | | Infinity | | 0.814 | | | | |
| 16 | Image plane | Infinity | | — | | | | |

TABLE 2

Aspheric Coefficients

| Surface | 1 | 2 | 3 | 4 | 6 | 7 |
|---|---|---|---|---|---|---|
| K: | 6.4800E+00 | −8.6507E−01 | −9.9802E+01 | 5.0719E+01 | −2.1938E+00 | 1.1436E+00 |
| A2: | 0.0000E+00 | 0.0000E+00 | 0.0000E+00 | 0.0000E+00 | 0.0000E+00 | 0.0000E+00 |
| A4: | 3.8082E−03 | 1.6649E−03 | −1.7407E−02 | 5.7815E−03 | 5.3062E−03 | 2.7514E−03 |
| A6: | −1.6758E−04 | 5.5762E−04 | 1.6747E−03 | 3.8495E−03 | −6.3183E−03 | −8.0292E−03 |
| A8: | 5.6201E−06 | 5.9747E−04 | −4.0844E−04 | −9.5378E−04 | 9.8648E−04 | −2.1954E−03 |
| A10: | −1.0583E−07 | −1.5350E−04 | 8.0077E−06 | 6.0402E−04 | 9.8648E−04 | 8.8646E−04 |
| A12: | 9.4723E−10 | 2.5800E−05 | 2.0196E−05 | −5.7793E−04 | 0.0000E+00 | 0.0000E+00 |
| A14: | 7.3555E−14 | −1.9800E−06 | −2.3523E−06 | 3.6401E−04 | 0.0000E+00 | 0.0000E+00 |
| A16: | 0.0000E+00 | 0.0000E+00 | 0.0000E+00 | 0.0000E+00 | 0.0000E+00 | 0.0000E+00 |
| A18: | 0.0000E+00 | 0.0000E+00 | 0.0000E+00 | 0.0000E+00 | 0.0000E+00 | 0.0000E+00 |
| A20: | 0.0000E+00 | 0.0000E+00 | 0.0000E+00 | 0.0000E+00 | 0.0000E+00 | 0.0000E+00 |

| Surface | 8 | 9 | 10 | 11 | 12 | 13 |
|---|---|---|---|---|---|---|
| K | −1.4538E+00 | 2.6202E−01 | −1.6745E+00 | 1.3510E+00 | −4.2405E+00 | −1.7290E+01 |
| A2: | 0.0000E+00 | 0.0000E+00 | 0.0000E+00 | 0.0000E+00 | 0.0000E+00 | 0.0000E+00 |
| A4: | −8.1101E−03 | −2.0037E−02 | −9.3177E−03 | −2.2117E−03 | −2.6424E−02 | −1.1740E−02 |
| A6: | −3.9557E−03 | 1.2292E−02 | −8.4655E−03 | 2.5953E−03 | 1.1146E−02 | −2.8279E−03 |
| A8: | −3.6503E−03 | 3.4465E−05 | 5.7633E−03 | 2.6178E−04 | −1.1823E−03 | 2.0901E−03 |
| A10: | −2.2269E−05 | −4.4559E−04 | 1.1651E−03 | −5.6003E−04 | 1.0273E−04 | −2.3324E−04 |
| A12: | 6.4766E−04 | 1.8465E−05 | −2.0152E−04 | 2.0305E−04 | −6.5631E−06 | −3.9733E−05 |
| A14: | −3.6092E−06 | 1.3402E−04 | −9.6461E−05 | −3.7017E−05 | −7.4755E−07 | 1.3103E−05 |
| A16: | 0.0000E+00 | 0.0000E+00 | 0.0000E+00 | 0.0000E+00 | 0.0000E+00 | 0.0000E+00 |
| A18: | 0.0000E+00 | 0.0000E+00 | 0.0000E+00 | 0.0000E+00 | 0.0000E+00 | 0.0000E+00 |
| A20: | 0.0000E+00 | 0.0000E+00 | 0.0000E+00 | 0.0000E+00 | 0.0000E+00 | 0.0000E+00 |

In Table 1, the units of the radius of curvature, the thickness, the gap and the focal length are expressed in mm, and the surface numbers 0-16 respectively represent the surfaces from the object-side to the image-side, wherein the surface 0 represents a gap between an object and the object-side surface 111 of the first lens 110 along the optical axis 190; the surface 1 represents the thickness of the first lens 110 along the optical axis 190; the surface 3 represents the thickness of the second lens 120 along the optical axis 190; the surface 6 represents the thickness of the third lens 130 along the optical axis 190; the surface 8 represents the thickness of the fourth lens 140 along the optical axis 190; the surface 10 represents the thickness of the fifth lens 150 along the optical axis 190; the surface 12 represents the thickness of the sixth lens 160 along the optical axis 190; the surface 14 represents the thickness of the optical filter 170 along the optical axis 190; the surface 2 represents a gap between the first lens 110 and the second lens 120 along the optical axis 190; the surface 4 represents a gap between the second lens 120 and the stop 100 along the optical axis 190; the surface 5 represents a gap between the stop 100 and the third lens 130 along the optical axis 190, which is expressed as a positive value since the stop 100 is closer to the object-side than the object-side surface 131 of the third lens 130; the surface 7 represents a gap between the third lens 130 and the fourth lens 140 along the optical axis 190; the surface 9 represents a gap between the fourth lens 140 and the fifth lens 150 along the optical axis 190; the surface 11 represents a gap between the fifth lens 150 and the sixth lens 160 along the optical axis 190; the surface 13 represents a gap between the sixth lens 160 and the optical filter 170 along the optical axis 190; and the surface 15 represents a gap between the optical filter 170 and the image plane 182 along the optical axis 190.

In table 2, k represents the conic constant of the equation of aspheric surface profiles, and A2, A4, A6, A8, A10, A12, A14, A16, A18, and A20 represent the high-order aspheric coefficients. The respective tables presented below for respective one of other embodiments are based on the schematic view of this embodiment, and the definitions of parameters in the tables are the same as those in Tables 1-2 of the first embodiment. Therefore, an explanation in this regard will not be provided again.

Second Embodiment

Figure 2A:
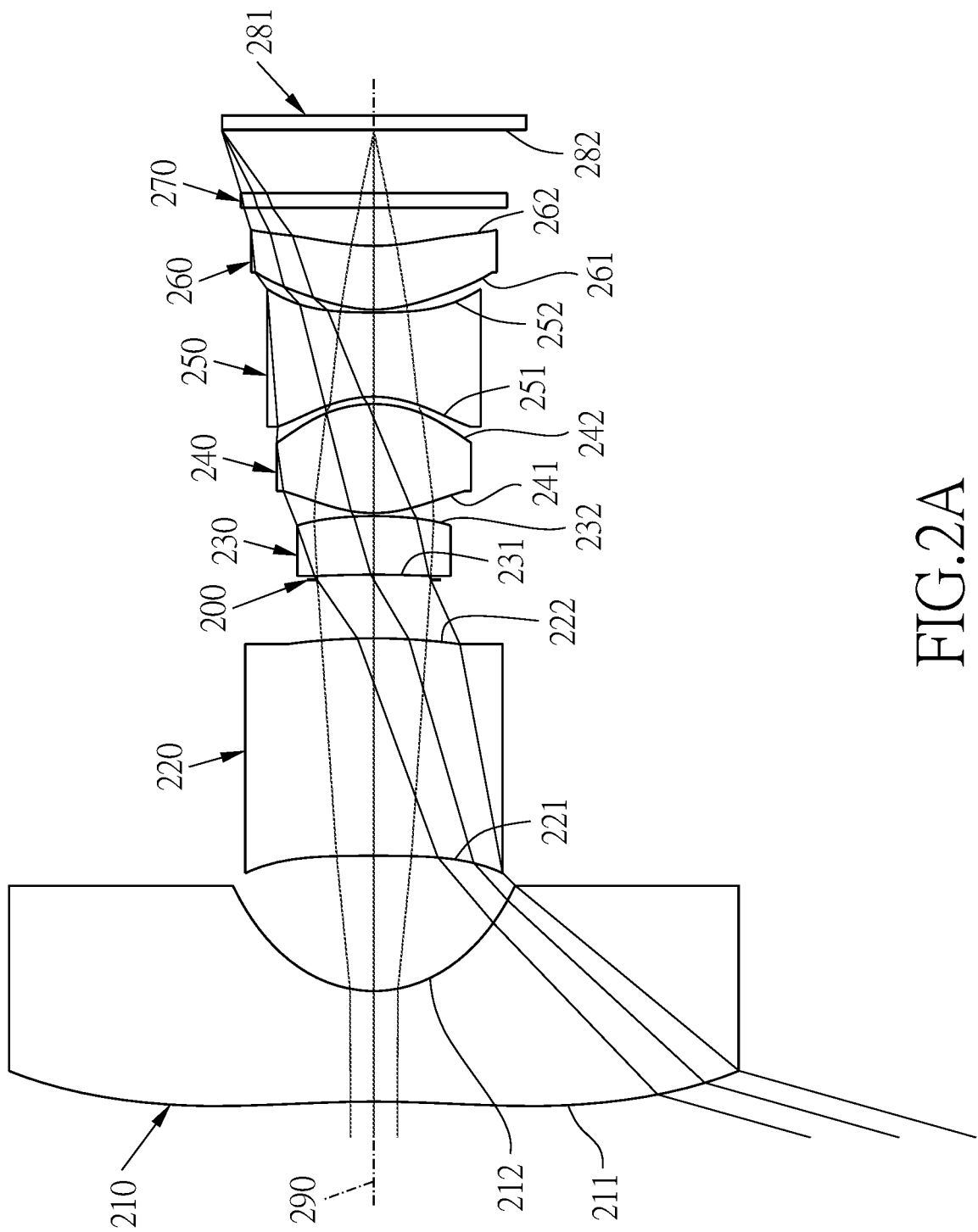
FIG. 2A is a schematic view of an optical lens assembly in accordance with a second embodiment of the present invention.
Figure 2B:
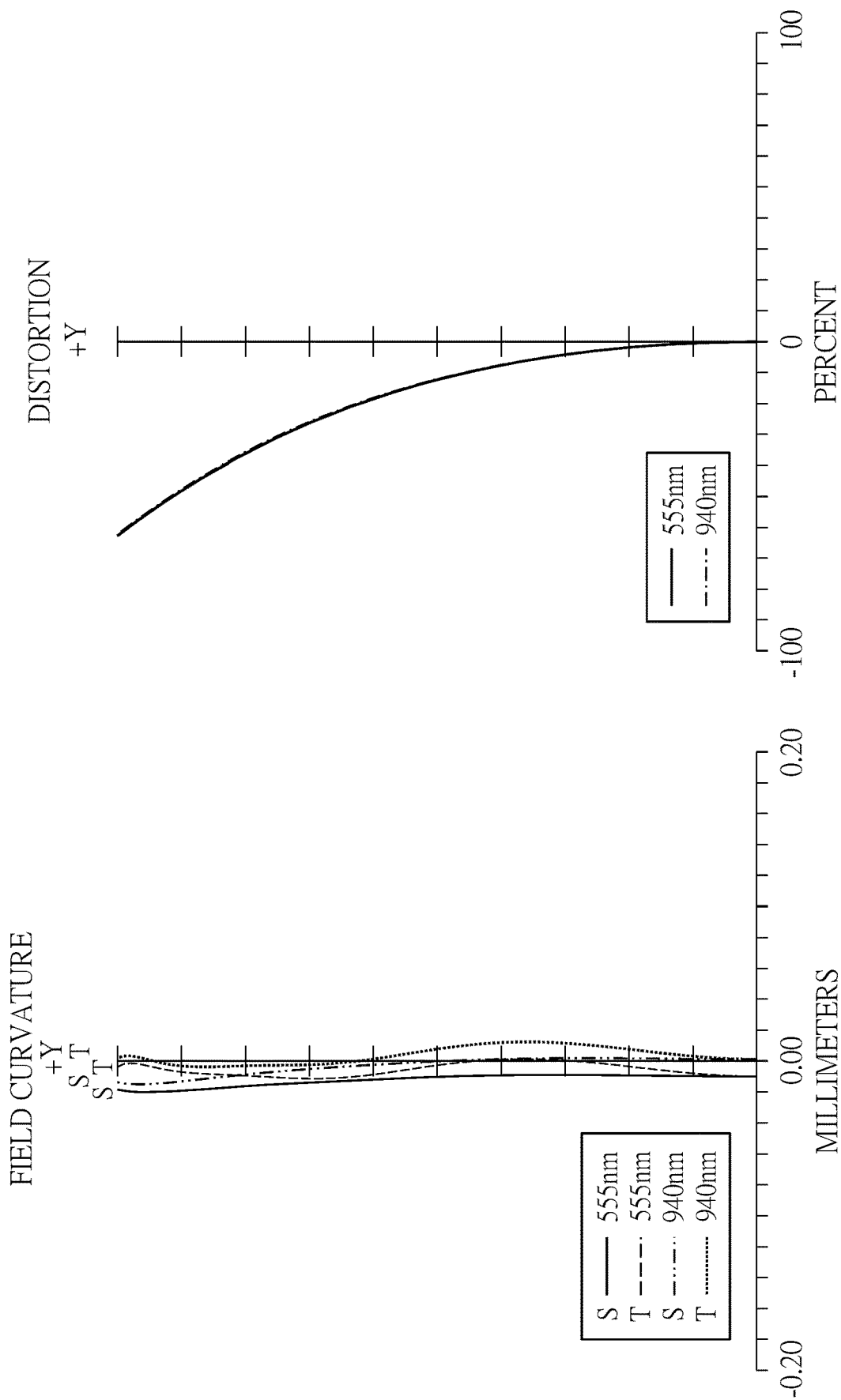
FIG. 2B is a schematic diagram showing, in order from left to right, the field curvature curve and the distortion curve of the second embodiment of the present invention, which illustrate the states of the field curvature curve and the distortion curve in both visible and infrared light bands.

Referring to FIGS. 2A and 2B, FIG. 2A shows a schematic view of an optical lens assembly in accordance with a second embodiment of the present invention, FIG. 2B shows, in order from left to right, the field curvature curve and the distortion curve of the second embodiment of the present invention, which illustrate the states of the field curvature curve and the distortion curve in both visible and infrared light bands. As shown in FIG. 2A, the optical lens assembly includes, in order from an object side to an image side along an optical axis 290: a first lens 210, a second lens 220, a stop 200, a third lens 230, a fourth lens 240, a fifth lens 250, a sixth lens 260, an optical filter 270, and an image plane 282. The optical lens assembly can cooperate with an image sensor 281 disposed on an image plane 282. The optical lens assembly has a total of six lenses with refractive power, but not is limited thereto.

The first lens 210 with negative refractive power includes an object-side surface 211 and an image-side surface 212, the object-side surface 211 of the first lens 210 is concave in a paraxial region thereof, the image-side surface 212 of the first lens 210 is concave in a paraxial region thereof, the object-side surface 211 and the image-side surface 212 of the first lens 210 are aspheric, and the first lens 210 is made of plastic.

The second lens 220 with positive refractive power includes an object-side surface 221 and an image-side surface 222, the object-side surface 221 of the second lens 220 is concave in a paraxial region thereof, the image-side surface 222 of the second lens 220 is convex in a paraxial region thereof, the object-side surface 221 and the image-side surface 222 of the second lens 220 are aspheric, and the second lens 220 is made of plastic.

The third lens 230 with positive refractive power includes an object-side surface 231 and an image-side surface 232, the object-side surface 231 of the third lens 230 is concave in a paraxial region thereof, the image-side surface 232 of the third lens 230 is convex in a paraxial region thereof, the object-side surface 231 and the image-side surface 232 of the third lens 230 are aspheric, and the third lens 230 is made of glass.

The fourth lens 240 with positive refractive power includes an object-side surface 241 and an image-side surface 242, the object-side surface 241 of the fourth lens 240 is convex in a paraxial region thereof, the image-side surface 242 of the fourth lens 240 is convex in a paraxial region thereof, the object-side surface 241 and the image-side surface 242 of the fourth lens 240 are aspheric, and the fourth lens 240 is made of plastic.

The fifth lens 250 with negative refractive power includes an object-side surface 251 and an image-side surface 252, the object-side surface 251 of the fifth lens 250 is concave in a paraxial region thereof, the image-side surface 252 of the fifth lens 250 is concave in a paraxial region thereof, the object-side surface 251 and the image-side surface 252 of the fifth lens 250 are aspheric, and the fifth lens 250 is made of plastic.

The sixth lens 260 with positive refractive power includes an object-side surface 261 and an image-side surface 262, the object-side surface 261 of the sixth lens 260 is convex in a paraxial region thereof, the image-side surface 262 of the sixth lens 260 is concave in a paraxial region thereof, the object-side surface 261 and the image-side surface 262 of the sixth lens 260 are aspheric, and the sixth lens 260 is made of plastic.

The optical filter 270 is made of glass, is located between the sixth lens 260 and the image plane 282, and has no influence on the focal length of the optical lens assembly. In the present embodiment, the optical filter 270 is selected from filters that allow light in the visible light wavelengths, in the infrared light wavelengths or in both the visible and infrared light wavelengths to pass therethrough.

The detailed optical data of the respective elements in the optical lens assembly of the second embodiment is shown in Table 3, and the aspheric coefficients of the lenses in the second embodiment is shown in Table 4.

TABLE 3

Embodiment 2
f = 1.60 mm, Fno = 2.20, FOV = 151.0°

| Surface | | Radius of curvature | | Thickness/ gap | Material | Refractive index (nd) | Abbe number (vd) | Focal length |
|---|---|---|---|---|---|---|---|---|
| 0 | Object | Infinity | | Infinity | | | | |
| 1 | First lens | −19.773 | (ASP) | 1.537 | plastic | 1.544 | 56.0 | −3.31 |
| 2 | | 2.041 | (ASP) | 1.891 | | | | |
| 3 | Second lens | −37.686 | (ASP) | 3.032 | plastic | 1.661 | 20.4 | 17.95 |
| 4 | | −9.372 | (ASP) | 0.809 | | | | |
| 5 | Stop | Infinity | | 0.074 | | | | |
| 6 | Third lens | −13.620 | (ASP) | 0.815 | glass | 1.806 | 40.7 | 13.76 |
| 7 | | −6.293 | (ASP) | 0.040 | | | | |
| 8 | Fourth lens | 2.168 | (ASP) | 1.520 | plastic | 1.544 | 56.0 | 2.25 |
| 9 | | −2.129 | (ASP) | 0.103 | | | | |
| 10 | Fifth lens | −1.838 | (ASP) | 1.172 | plastic | 1.661 | 20.4 | −2.32 |
| 11 | | 12.301 | (ASP) | 0.042 | | | | |

TABLE 3-continued

Embodiment 2
f = 1.60 mm, Fno = 2.20, FOV = 151.0°

| Surface | | Radius of curvature | | Thickness/gap | Material | Refractive index (nd) | Abbe number (vd) | Focal length |
|---|---|---|---|---|---|---|---|---|
| 12 | Seventh lens | 2.050 | (ASP) | 0.888 | plastic | 1.544 | 56.0 | 7.43 |
| 13 | | 3.512 | (ASP) | 0.526 | | | | |
| 14 | Optical filter | Infinity | | 0.210 | glass | 1.517 | 64.2 | |
| 15 | | Infinity | | 0.877 | | | | |
| 16 | Image plane | Infinity | | — | | | | |

TABLE 4

Aspheric Coefficients

| Surface | 1 | 2 | 3 | 4 | 6 | 7 |
|---|---|---|---|---|---|---|
| K: | 7.3631E+00 | −8.5693E−01 | 2.6441E+01 | 1.5740E+01 | 0.0000E+00 | 0.0000E+00 |
| A2: | 0.0000E+00 | 0.0000E+00 | 0.0000E+00 | 0.0000E+00 | 0.0000E+00 | 0.0000E+00 |
| A4: | 3.4251E−03 | 4.6821E−03 | −1.4467E−02 | 7.9229E−03 | 3.2489E−02 | 1.4854E−03 |
| A6: | −1.5430E−04 | 1.5062E−03 | 1.7731E−03 | −2.9248E−03 | −2.0378E−02 | −1.0157E−02 |
| A8: | 5.2803E−06 | 2.3959E−04 | −7.7514E−04 | 6.7067E−05 | 0.0000E+00 | 0.0000E+00 |
| A10: | −1.0809E−07 | −3.4239E−05 | 4.3488E−05 | 4.3231E−04 | 0.0000E+00 | 0.0000E+00 |
| A12: | 1.2384E−09 | 7.2912E−06 | 2.9361E−05 | −2.0180E−04 | 0.0000E+00 | 0.0000E+00 |
| A14: | −5.0892E−12 | −1.2228E−06 | −3.6805E−06 | 2.3532E−05 | 0.0000E+00 | 0.0000E+00 |
| A16: | 0.0000E+00 | 0.0000E+00 | 0.0000E+00 | 0.0000E+00 | 0.0000E+00 | 0.0000E+00 |
| A18: | 0.0000E+00 | 0.0000E+00 | 0.0000E+00 | 0.0000E+00 | 0.0000E+00 | 0.0000E+00 |
| A20: | 0.0000E+00 | 0.0000E+00 | 0.0000E+00 | 0.0000E+00 | 0.0000E+00 | 0.0000E+00 |

| Surface | 8 | 9 | 10 | 11 | 12 | 13 |
|---|---|---|---|---|---|---|
| K: | −2.6116E+00 | 6.7630E−02 | −4.2512E+00 | 2.8260E+01 | −4.9619E+00 | −5.7951E+00 |
| A2 | 0.0000E+00 | 0.0000E+00 | 0.0000E+00 | 0.0000E+00 | 0.0000E+00 | 0.0000E+00 |
| A4: | −1.4270E−02 | −1.6687E−02 | −1.2574E−02 | 3.5761E−02 | −2.1072E−02 | −3.0853E−02 |
| A6: | −9.7908E−04 | 1.4355E−02 | −8.4726E−03 | 6.7284E−05 | 7.5046E−03 | 3.4841E−03 |
| A8: | −1.3066E−03 | −2.0293E−03 | 9.5779E−03 | −3.9852E−04 | −6.6367E−04 | 1.1506E−03 |
| A10: | −1.8433E−03 | 1.0247E−03 | −1.4932E−04 | −2.9977E−04 | 2.0516E−04 | −4.1726E−04 |
| A12: | 1.1264E−03 | −2.1187E−04 | −7.4822E−04 | 1.2385E−04 | −3.6165E−05 | 1.1857E−05 |
| A14: | −9.1470E−05 | 4.7940E−05 | 1.4920E−04 | −4.7060E−05 | −2.2317E−06 | 2.2161E−05 |
| A16: | 0.0000E+00 | 0.0000E+00 | −2.6438E−05 | 5.4942E−06 | 5.5794E−07 | −2.8203E−06 |
| A18: | 0.0000E+00 | 0.0000E+00 | 0.0000E+00 | 0.0000E+00 | 0.0000E+00 | 0.0000E+00 |
| A20: | 0.0000E+00 | 0.0000E+00 | 0.0000E+00 | 0.0000E+00 | 0.0000E+00 | 0.0000E+00 |

In the second embodiment, the curve equation of the aspheric surface profiles of the aforementioned lenses is the same as the curve equation of the first embodiment. Also, the definitions of these parameters shown in the following table are the same as those stated in the first embodiment, so an explanation in this regard will not be provided again.

These parameters can be calculated from Table 3 and Table 4 as the following values, and the following conditions in the following table are satisfied.

| Embodiment 2 | | | |
|---|---|---|---|
| f[mm] | 1.60 | TL/(IMH*f)[mm$^{-1}$] | 3.67 |
| EPD[mm] | 0.71 | FOV/CRA | 5.30 |
| Fno | 2.20 | f2/f3 | 1.30 |
| FOV[°] | 151.0 | (R8/R9)/T45[mm$^{-1}$] | 11.25 |
| f/f1 | −0.48 | R10/R11 | 6.00 |
| R5/R6 | 2.16 | (CT4 + CT6)/(CT5*f5)[mm$^{-1}$] | −0.89 |
| f4/f5 | −0.97 | f5*f6/f[mm] | −10.80 |
| (R5*R6)/(f3*CT3) | 7.64 | tan(CRA)*BFL/IMH | 0.38 |
| f6/R11 | 3.62 | CRA/(BFL*f)[°/mm$^2$] | 11.06 |
| f4*R8/(R9*f5) | −1.12 | vd3/(nd3*f3*CT3)[mm$^{-2}$] | 2.01 |
| (TL-BFL)/IMH | 5.17 | | |

Third Embodiment

Figure 3A:
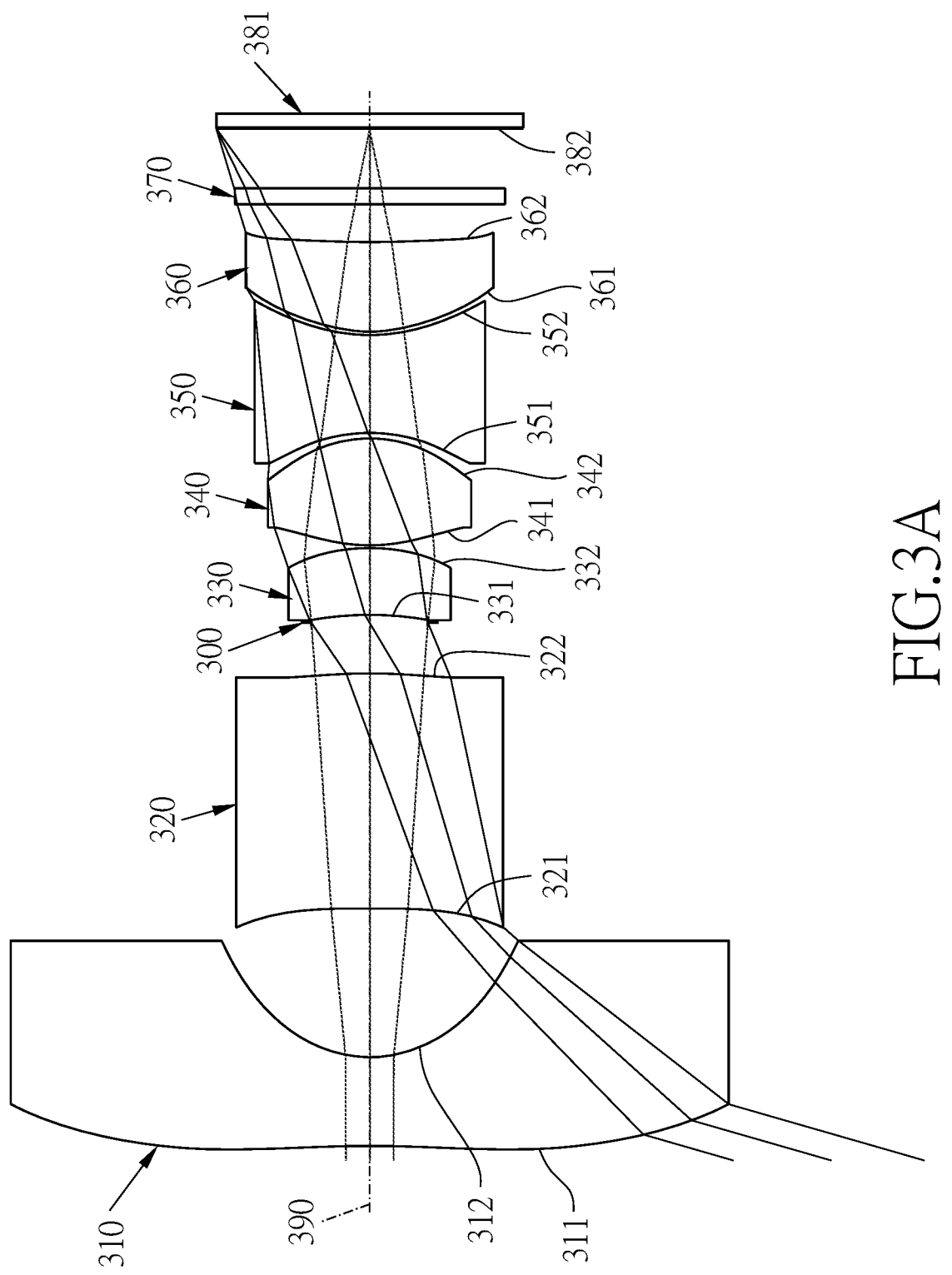
FIG. 3A is a schematic view of an optical lens assembly in accordance with a third embodiment of the present invention.
Figure 3B:
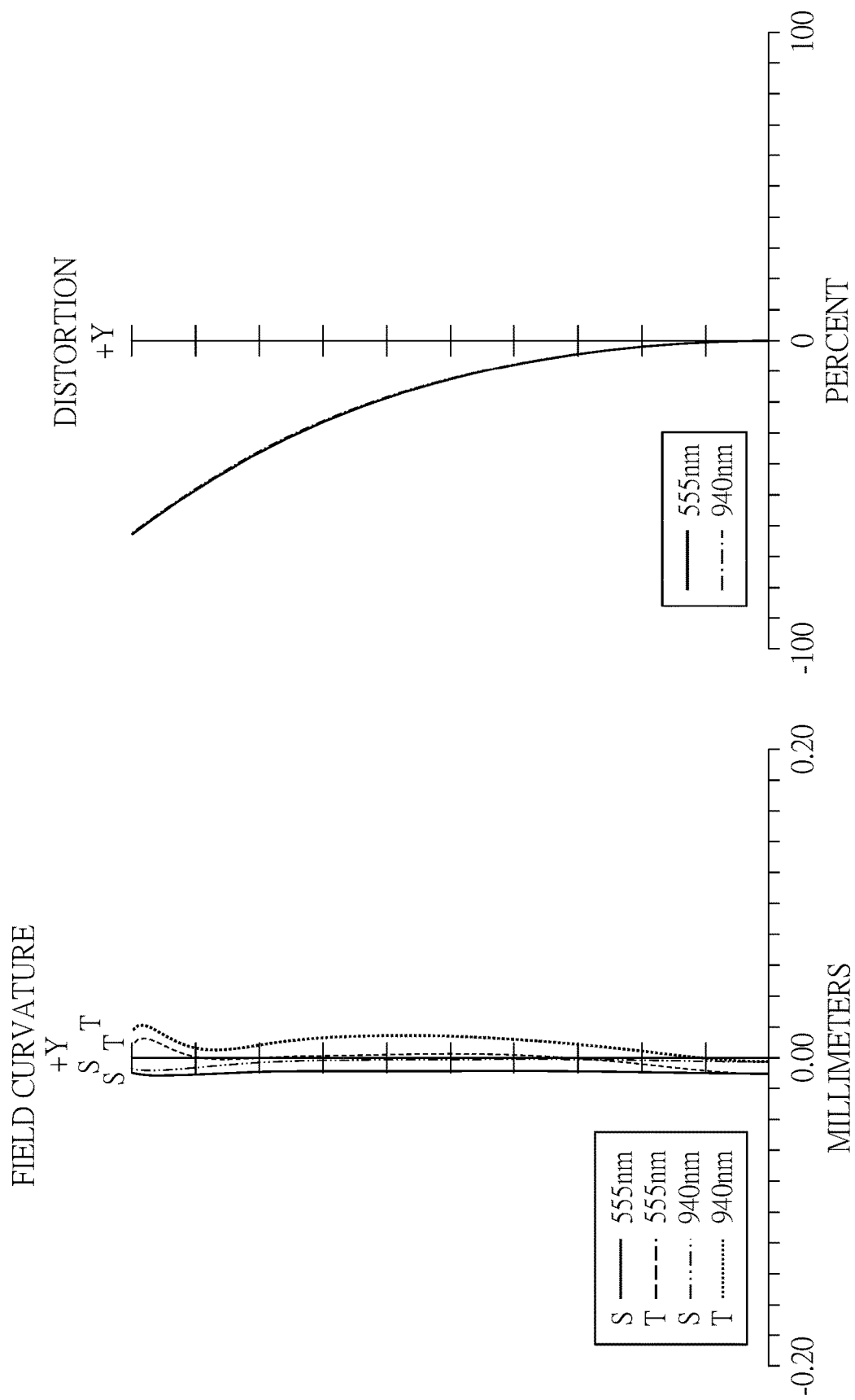
FIG. 3B is a schematic diagram showing, in order from left to right, the field curvature curve and the distortion curve of the third embodiment of the present invention, which illustrate the states of the field curvature curve and the distortion curve in both visible and infrared light bands.

Referring to FIGS. 3A and 3B, FIG. 3A shows a schematic view of an optical lens assembly in accordance with a third embodiment of the present invention, FIG. 3B shows, in order from left to right, the field curvature curve and the distortion curve of the third embodiment of the present invention, which illustrate the states of the field curvature curve and the distortion curve in both visible and infrared light bands. As shown in FIG. 3A, the optical lens assembly includes, in order from an object side to an image side along an optical axis 390: a first lens 310, a second lens 320, a stop 300, a third lens 330, a fourth lens 340, a fifth lens 350, a sixth lens 360, an optical filter 370, and an image plane 382. The optical lens assembly can cooperate with an image sensor 381 disposed on an image plane 382. The optical lens assembly has a total of six lenses with refractive power, but not is limited thereto.

The first lens 310 with negative refractive power includes an object-side surface 311 and an image-side surface 312, the object-side surface 311 of the first lens 310 is concave in a paraxial region thereof, the image-side surface 312 of the first lens 310 is concave in a paraxial region thereof, the object-side surface 311 and the image-side surface 312 of the first lens 310 are aspheric, and the first lens 310 is made of plastic.

The second lens 320 with positive refractive power includes an object-side surface 321 and an image-side surface 322, the object-side surface 321 of the second lens 320 is concave in a paraxial region thereof, the image-side surface 322 of the second lens 320 is convex in a paraxial region thereof, the object-side surface 321 and the image-side surface 322 of the second lens 320 are aspheric, and the second lens 320 is made of plastic.

The third lens 330 with positive refractive power includes an object-side surface 331 and an image-side surface 332, the object-side surface 331 of the third lens 330 is concave in a paraxial region thereof, the image-side surface 332 of the third lens 330 is convex in a paraxial region thereof, the object-side surface 331 and the image-side surface 332 of the third lens 330 are aspheric, and the third lens 330 is made of glass.

The fourth lens 340 with positive refractive power includes an object-side surface 341 and an image-side surface 342, the object-side surface 341 of the fourth lens 340 is convex in a paraxial region thereof, the image-side surface 342 of the fourth lens 340 is convex in a paraxial region thereof, the object-side surface 341 and the image-side surface 342 of the fourth lens 340 are aspheric, and the fourth lens 340 is made of plastic.

The fifth lens 350 with negative refractive power includes an object-side surface 351 and an image-side surface 352, the object-side surface 351 of the fifth lens 350 is concave in a paraxial region thereof, the image-side surface 352 of the fifth lens 350 is concave in a paraxial region thereof, the object-side surface 351 and the image-side surface 352 of the fifth lens 350 are aspheric, and the fifth lens 350 is made of plastic.

The sixth lens 360 with positive refractive power includes an object-side surface 361 and an image-side surface 362, the object-side surface 361 of the sixth lens 360 is convex in a paraxial region thereof, the image-side surface 362 of the sixth lens 360 is concave in a paraxial region thereof, the object-side surface 361 and the image-side surface 362 of the sixth lens 360 are aspheric, and the sixth lens 360 is made of plastic.

The optical filter 370 is made of glass, is located between the sixth lens 360 and the image plane 382, and has no influence on the focal length of the optical lens assembly. In the present embodiment, the optical filter 370 is selected from filters that allow light in the visible light wavelengths, in the infrared light wavelengths or in both the visible and infrared light wavelengths to pass therethrough.

The detailed optical data of the respective elements in the optical lens assembly of the third embodiment is shown in Table 5, and the aspheric coefficients of the lenses in the third embodiment is shown in Table 6.

TABLE 5

Embodiment 3
f = 1.60 mm, Fno = 2.20, FOV = 151.0°

| Surface | | Radius of curvature | | Thickness/gap | Material | Refractive index (nd) | Abbe number (vd) | Focal length |
|---|---|---|---|---|---|---|---|---|
| 0 | Object | Infinity | | Infinity | | | | |
| 1 | First lens | −20.062 | (ASP) | 1.195 | plastic | 1.544 | 56.0 | −3.39 |
| 2 | | 2.084 | (ASP) | 2.007 | | | | |
| 3 | Second lens | −32.391 | (ASP) | 3.165 | plastic | 1.661 | 20.4 | 20.23 |
| 4 | | −9.891 | (ASP) | 0.688 | | | | |
| 5 | Stop | Infinity | | 0.100 | | | | |
| 6 | Third lens | −5.910 | (ASP) | 0.906 | glass | 1.810 | 41.0 | 7.46 |
| 7 | | −3.201 | (ASP) | 0.040 | | | | |
| 8 | Fourth lens | 3.113 | (ASP) | 1.434 | plastic | 1.544 | 56.0 | 2.66 |
| 9 | | −2.284 | (ASP) | 0.076 | | | | |
| 10 | Fifth lens | −2.883 | (ASP) | 1.321 | plastic | 1.661 | 20.4 | −2.01 |
| 11 | | 2.954 | (ASP) | 0.049 | | | | |
| 12 | Sixth lens | 2.413 | (ASP) | 1.203 | plastic | 1.544 | 56.0 | 5.05 |
| 13 | | 15.906 | (ASP) | 0.514 | | | | |
| 14 | Optical filter | Infinity | | 0.210 | glass | 1.517 | 64.2 | |
| 15 | | Infinity | | 0.814 | | | | |
| 16 | Image plane | Infinity | | — | | | | |

TABLE 6

Aspheric Coefficients

| Surface | 1 | 2 | 3 | 4 | 6 | 7 |
|---|---|---|---|---|---|---|
| K: | 8.4374E+00 | −6.8631E−01 | −9.3734E+01 | 5.0648E+00 | −6.3532E−02 | −4.0414E−03 |
| A2: | 0.0000E+00 | 0.0000E+00 | 0.0000E+00 | 0.0000E+00 | 0.0000E+00 | 0.0000E+00 |
| A4: | 4.0492E−03 | 2.0271E−03 | −1.5465E−02 | 8.5315E−03 | 8.0487E−03 | −4.7757E−03 |
| A6: | −1.8643E−04 | 5.8110E−04 | 2.0209E−03 | 3.4195E−03 | −9.9287E−03 | −5.9364E−03 |
| A8: | 6.0053E−06 | 5.5207E−04 | −5.2698E−04 | −2.4473E−03 | 0.0000E+00 | −4.7113E−04 |
| A10: | −1.0271E−07 | −1.2974E−04 | −1.1615E−05 | 9.0971E−04 | 0.0000E+00 | 0.0000E+00 |
| A12: | 7.1657E−10 | 2.5967E−05 | 3.0248E−05 | 2.6311E−04 | 0.0000E+00 | 0.0000E+00 |
| A14: | 2.9179E−12 | −2.7738E−06 | −3.3262E−06 | −2.2020E−04 | 0.0000E+00 | 0.0000E+00 |

TABLE 6-continued

Aspheric Coefficients

| A16: | 0.0000E+00 | 0.0000E+00 | 0.0000E+00 | 0.0000E+00 | 0.0000E+00 | 0.0000E+00 |
|---|---|---|---|---|---|---|
| A18: | 0.0000E+00 | 0.0000E+00 | 0.0000E+00 | 0.0000E+00 | 0.0000E+00 | 0.0000E+00 |
| A20: | 0.0000E+00 | 0.0000E+00 | 0.0000E+00 | 0.0000E+00 | 0.0000E+00 | 0.0000E+00 |

| Surface | 8 | 9 | 10 | 11 | 12 | 13 |
|---|---|---|---|---|---|---|
| K: | −2.3001E+00 | 7.8895E−02 | −7.5700E−01 | 4.5709E−02 | −1.9419E+00 | −6.7920E+01 |
| A2: | 0.0000E+00 | 0.0000E+00 | 0.0000E+00 | 0.0000E+00 | 0.0000E+00 | 0.0000E+00 |
| A4: | −9.9627E−03 | −8.3773E−03 | −1.0946E−02 | −1.6623E−02 | −3.2110E−02 | −4.3273E−03 |
| A6: | −5.2868E−04 | 3.4902E−03 | −4.1931E−03 | 2.2114E−03 | 1.1141E−02 | −6.5733E−04 |
| A8: | −2.7362E−03 | 5.0401E−04 | 2.9376E−03 | 6.7181E−04 | −6.3251E−04 | 9.6498E−04 |
| A10: | −1.4172E−04 | 1.0706E−04 | 4.6696E−04 | −2.6889E−04 | −2.6798E−05 | −1.1438E−04 |
| A12: | 2.8260E−04 | −1.4807E−04 | 1.8662E−04 | 1.3064E−05 | −2.3547E−05 | 5.7861E−06 |
| A14: | 3.8238E−05 | 9.0106E−05 | −1.0814E−04 | −3.7114E−06 | 4.1288E−06 | 5.1378E−06 |
| A16: | 0.0000E+00 | 0.0000E+00 | 0.0000E+00 | 0.0000E+00 | 0.0000E+00 | 0.0000E+00 |
| A18: | 0.0000E+00 | 0.0000E+00 | 0.0000E+00 | 0.0000E+00 | 0.0000E+00 | 0.0000E+00 |
| A20: | 0.0000E+00 | 0.0000E+00 | 0.0000E+00 | 0.0000E+00 | 0.0000E+00 | 0.0000E+00 |

In the third embodiment, the curve equation of the aspheric surface profiles of the aforementioned lenses is the same as the curve equation of the first embodiment. Also, the definitions of these parameters shown in the following table are the same as those stated in the first embodiment, so an explanation in this regard will not be provided again.

These parameters can be calculated from Table 5 and Table 6 as the following values, and the following conditions in the following table are satisfied.

| Embodiment 3 | | | |
|---|---|---|---|
| f[mm] | 1.60 | TL/(IMH*f)[mm$^{-1}$] | 3.71 |
| EPD[mm] | 0.72 | FOV/CRA | 5.30 |
| Fno | 2.20 | f2/f3 | 2.71 |
| FOV[°] | 151.0 | (R8/R9)/T45[mm$^{-1}$] | 7.69 |
| f/f1 | −0.47 | R10/R11 | 1.22 |
| R5/R6 | 1.85 | (CT4 + CT6)/(CT5*f5)[mm$^{-1}$] | −1.02 |
| f4/f5 | −1.33 | f5*f6/f[mm] | −6.33 |
| (R5*R6)/(f3*CT3) | 2.80 | tan(CRA)*BFL/IMH | 0.36 |
| f6/R11 | 2.09 | CRA/(BFL*f)[°/mm$^2$] | 11.57 |
| f4*R8/(R9*f5) | −1.05 | vd3/(nd3*f3*CT3)[mm$^{-2}$] | 3.35 |
| (TL-BFL)/IMH | 5.28 | | |

Fourth Embodiment

Figure 4A:
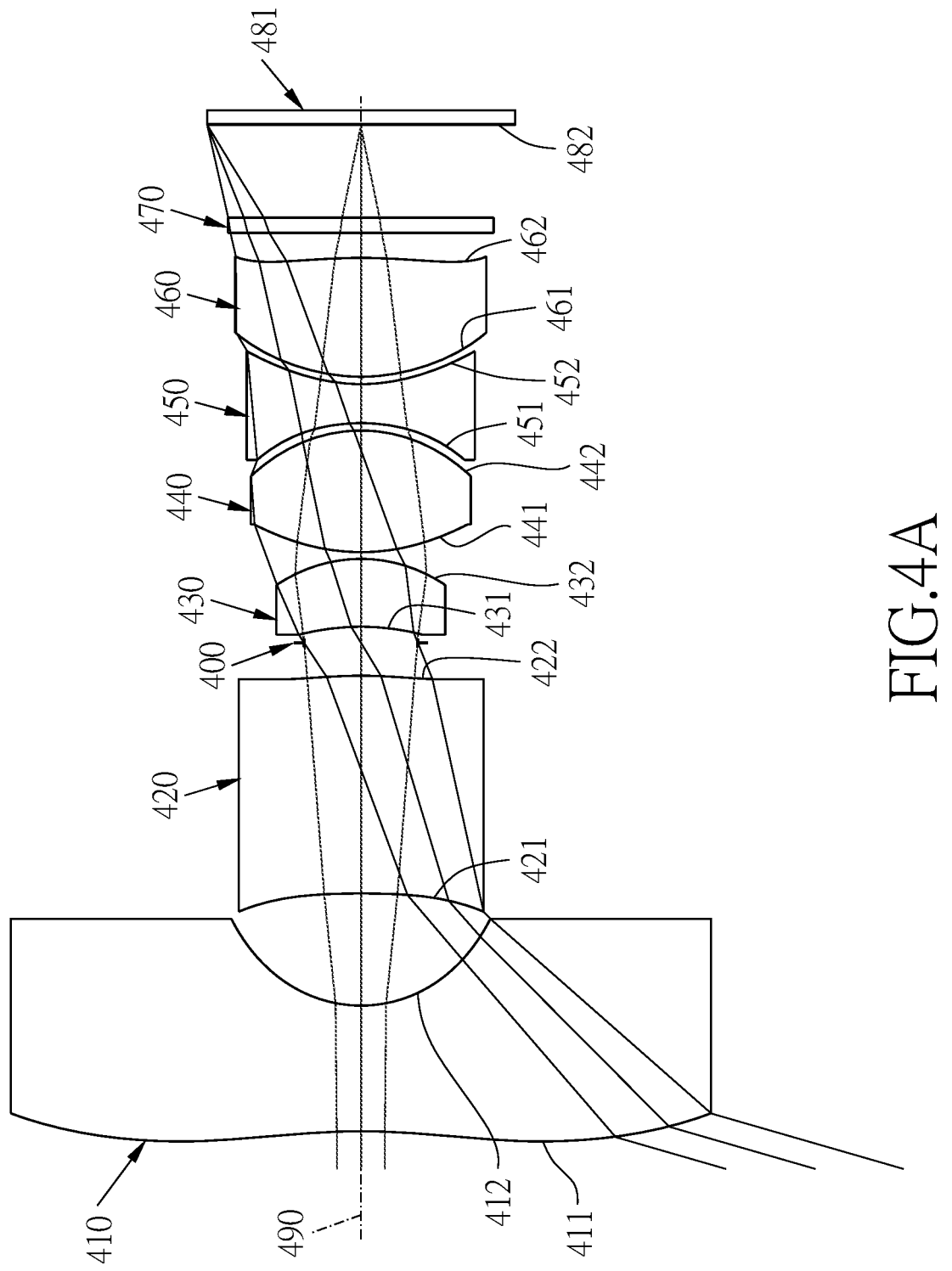
FIG. 4A is a schematic view of an optical lens assembly in accordance with a fourth embodiment of the present invention.
Figure 4B:
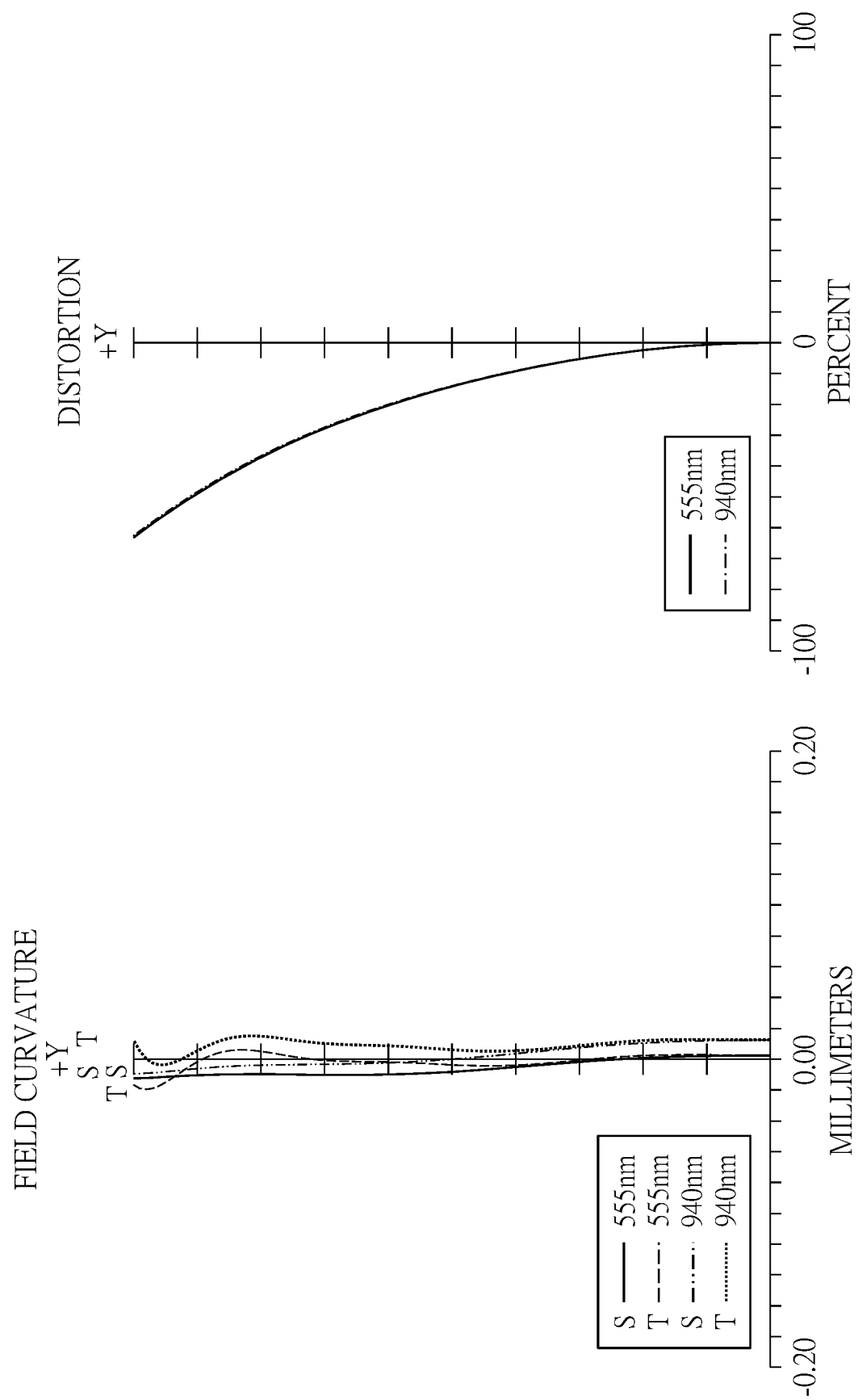
FIG. 4B is a schematic diagram showing, in order from left to right, the field curvature curve and the distortion curve of the fourth embodiment of the present invention, which illustrate the states of the field curvature curve and the distortion curve in both visible and infrared light bands.

Referring to FIGS. 4A and 4B, FIG. 4A shows a schematic view of an optical lens assembly in accordance with a fourth embodiment of the present invention, FIG. 4B shows, in order from left to right, the field curvature curve and the distortion curve of the fourth embodiment of the present invention, which illustrate the states of the field curvature curve and the distortion curve in both visible and infrared light bands. As shown in FIG. 4A, the optical lens assembly includes, in order from an object side to an image side along an optical axis 490: a first lens 410, a second lens 420, a stop 400, a third lens 430, a fourth lens 440, a fifth lens 450, a sixth lens 460, an optical filter 470, and an image plane 482. The optical lens assembly can cooperate with an image sensor 481 disposed on an image plane 482. The optical lens assembly has a total of six lenses with refractive power, but not is limited thereto.

The first lens 410 with negative refractive power includes an object-side surface 411 and an image-side surface 412, the object-side surface 411 of the first lens 410 is concave in a paraxial region thereof, the image-side surface 412 of the first lens 410 is concave in a paraxial region thereof, the object-side surface 411 and the image-side surface 412 of the first lens 410 are aspheric, and the first lens 410 is made of plastic.

The second lens 420 with positive refractive power includes an object-side surface 421 and an image-side surface 422, the object-side surface 421 of the second lens 420 is concave in a paraxial region thereof, the image-side surface 422 of the second lens 420 is convex in a paraxial region thereof, the object-side surface 421 and the image-side surface 422 of the second lens 420 are aspheric, and the second lens 420 is made of plastic.

The third lens 430 with positive refractive power includes an object-side surface 431 and an image-side surface 432, the object-side surface 431 of the third lens 430 is concave in a paraxial region thereof, the image-side surface 432 of the third lens 430 is convex in a paraxial region thereof, the object-side surface 431 and the image-side surface 432 of the third lens 430 are aspheric, and the third lens 430 is made of glass.

The fourth lens 440 with positive refractive power includes an object-side surface 441 and an image-side surface 442, the object-side surface 441 of the fourth lens 440 is convex in a paraxial region thereof, the image-side surface 442 of the fourth lens 440 is convex in a paraxial region thereof, the object-side surface 441 and the image-side surface 442 of the fourth lens 440 are aspheric, and the fourth lens 440 is made of plastic.

The fifth lens 450 with negative refractive power includes an object-side surface 451 and an image-side surface 452, the object-side surface 451 of the fifth lens 450 is concave in a paraxial region thereof, the image-side surface 452 of the fifth lens 450 is concave in a paraxial region thereof, the object-side surface 451 and the image-side surface 452 of the fifth lens 450 are aspheric, and the fifth lens 450 is made of plastic.

The sixth lens 460 with positive refractive power includes an object-side surface 461 and an image-side surface 462, the object-side surface 461 of the sixth lens 460 is convex in a paraxial region thereof, the image-side surface 462 of the sixth lens 460 is convex in a paraxial region thereof, the object-side surface 461 and the image-side surface 462 of the sixth lens 460 are aspheric, and the sixth lens 460 is made of plastic.

The optical filter 470 is made of glass, is located between the sixth lens 460 and the image plane 482, and has no influence on the focal length of the optical lens assembly. In the present embodiment, the optical filter 470 is selected from filters that allow light in the visible light wavelengths, in the infrared light wavelengths or in both the visible and infrared light wavelengths to pass therethrough.

The detailed optical data of the respective elements in the optical lens assembly of the fourth embodiment is shown in Table 7, and the aspheric coefficients of the lenses in the fourth embodiment is shown in Table 8.

TABLE 7

Embodiment 4
f = 1.63 mm, Fno = 2.20, FOV = 151.0°

| Surface | | Radius of curvature | | Thickness/gap | Material | Refractive index (nd) | Abbe number (vd) | Focal length |
|---|---|---|---|---|---|---|---|---|
| 0 | Object | Infinity | | Infinity | | | | |
| 1 | First lens | −11.185 | (ASP) | 1.689 | plastic | 1.544 | 56.0 | −3.21 |
| 2 | | 2.186 | (ASP) | 1.507 | | | | |
| 3 | Second lens | −15.275 | (ASP) | 2.929 | plastic | 1.661 | 20.4 | 20.38 |
| 4 | | −7.742 | (ASP) | 0.439 | | | | |
| 5 | Stop | Infinity | | 0.218 | | | | |
| 6 | Third lens | −4.100 | | 0.909 | glass | 1.773 | 49.6 | 6.44 |
| 7 | | −2.469 | | 0.093 | | | | |
| 8 | Fourth lens | 3.443 | (ASP) | 1.635 | plastic | 1.544 | 56.0 | 2.97 |
| 9 | | −2.548 | (ASP) | 0.097 | | | | |
| 10 | Fifth lens | −3.197 | (ASP) | 0.528 | plastic | 1.661 | 20.4 | −2.24 |
| 11 | | 2.982 | (ASP) | 0.100 | | | | |
| 12 | Sixth lens | 3.144 | (ASP) | 1.595 | plastic | 1.544 | 56.0 | 4.60 |
| 13 | | −10.264 | (ASP) | 0.334 | | | | |
| 14 | Optical filter | Infinity | | 0.210 | glass | 1.517 | 64.2 | |
| 15 | | Infinity | | 1.240 | | | | |
| 16 | Image plane | Infinity | | — | | | | |

TABLE 8

Aspheric Coefficients

| Surface | 1 | 2 | 3 | 4 | 6 | 7 |
|---|---|---|---|---|---|---|
| K: | 0.0000E+00 | 0.0000E+00 | 0.0000E+00 | 0.0000E+00 | 0.0000E+00 | 0.0000E+00 |
| A2: | 0.0000E+00 | 0.0000E+00 | 0.0000E+00 | 0.0000E+00 | 0.0000E+00 | 0.0000E+00 |
| A4: | 4.9727E−03 | −1.1483E−03 | −1.3516E−02 | 1.1132E−02 | 0.0000E+00 | 0.0000E+00 |
| A6: | −2.2374E−04 | −1.1980E−03 | 2.5645E−04 | 6.1876E−03 | 0.0000E+00 | 0.0000E+00 |
| A8: | 6.4865E−06 | 1.3153E−03 | 6.3664E−05 | 1.9481E−03 | 0.0000E+00 | 0.0000E+00 |
| A10: | −9.0668E−08 | −2.5137E−04 | 2.0044E−05 | −5.9241E−03 | 0.0000E+00 | 0.0000E+00 |
| A12: | 1.7640E−10 | −1.8944E−06 | −3.3125E−06 | 5.7376E−03 | 0.0000E+00 | 0.0000E+00 |
| A14: | 6.8234E−12 | −7.0882E−07 | 3.5748E−07 | −1.3848E−03 | 0.0000E+00 | 0.0000E+00 |
| A16: | 0.0000E+00 | 0.0000E+00 | 0.0000E+00 | 0.0000E+00 | 0.0000E+00 | 0.0000E+00 |
| A18: | 0.0000E+00 | 0.0000E+00 | 0.0000E+00 | 0.0000E+00 | 0.0000E+00 | 0.0000E+00 |
| A20: | 0.0000E+00 | 0.0000E+00 | 0.0000E+00 | 0.0000E+00 | 0.0000E+00 | 0.0000E+00 |

| Surface | 8 | 9 | 10 | 11 | 12 | 13 |
|---|---|---|---|---|---|---|
| K: | 0.0000E+00 | 0.0000E+00 | 0.0000E+00 | 0.0000E+00 | 0.0000E+00 | 0.0000E+00 |
| A2: | 0.0000E+00 | 0.0000E+00 | 0.0000E+00 | 0.0000E+00 | 0.0000E+00 | 0.0000E+00 |
| A4: | −2.5656E−03 | −3.6569E−03 | −1.5895E−02 | −1.8696E−02 | −1.4572E−02 | 6.5642E−03 |
| A6: | 1.3030E−03 | 8.0258E−04 | −1.5669E−03 | 3.0348E−03 | 5.5254E−03 | 3.5580E−03 |
| A8: | −5.2569E−04 | 2.9238E−04 | 1.2168E−03 | 3.4769E−04 | −8.2186E−04 | −3.3664E−04 |
| A10: | 8.8360E−05 | −2.4644E−05 | −3.7971E−04 | −1.9837E−04 | 5.1995E−05 | −1.1634E−05 |
| A12: | −1.6561E−05 | −1.5776E−05 | 1.1025E−05 | −1.6772E−06 | 1.7466E−06 | 1.5802E−05 |
| A14: | −1.0467E−05 | 5.8510E−07 | 2.0975E−05 | 9.3389E−07 | 3.8029E−08 | 5.5785E−06 |
| A16: | 0.0000E+00 | 0.0000E+00 | 0.0000E+00 | 0.0000E+00 | 0.0000E+00 | 0.0000E+00 |
| A18: | 0.0000E+00 | 0.0000E+00 | 0.0000E+00 | 0.0000E+00 | 0.0000E+00 | 0.0000E+00 |
| A20: | 0.0000E+00 | 0.0000E+00 | 0.0000E+00 | 0.0000E+00 | 0.0000E+00 | 0.0000E+00 |

In the fourth embodiment, the curve equation of the aspheric surface profiles of the aforementioned lenses is the same as the curve equation of the first embodiment. Also, the definitions of these parameters shown in the following table are the same as those stated in the first embodiment, so an explanation in this regard will not be provided again.

These parameters can be calculated from Table 7 and Table 8 as the following values, and the following conditions in the following table are satisfied.

| Embodiment 4 | | | |
|---|---|---|---|
| f[mm] | 1.63 | TL/(IMH*f)[mm$^{-1}$] | 3.61 |
| EPD[mm] | 0.73 | FOV/CRA | 6.31 |
| Fno | 2.20 | f2/f3 | 3.17 |
| FOV[°] | 151.0 | (R8/R9)/T45[mm$^{-1}$] | 8.20 |
| f/f1 | −0.51 | R10/R11 | 0.95 |
| R5/R6 | 1.66 | (CT4 + CT6)/(CT5*f5)[mm$^{-1}$] | −2.73 |
| f4/f5 | −1.33 | f5*f6/f[mm] | −6.34 |
| (R5*R6)/(f3*CT3) | 1.73 | tan(CRA)*BFL/IMH | 0.34 |
| f6/R11 | 1.46 | CRA/(BFL*f)[°/mm$^2$] | 8.24 |
| f4*R8/(R9*f5) | −1.06 | vd3/(nd3*f3*CT3)[mm$^{-2}$] | 4.78 |
| (TL-BFL)/IMH | 5.09 | | |

Fifth Embodiment

Figure 5A:
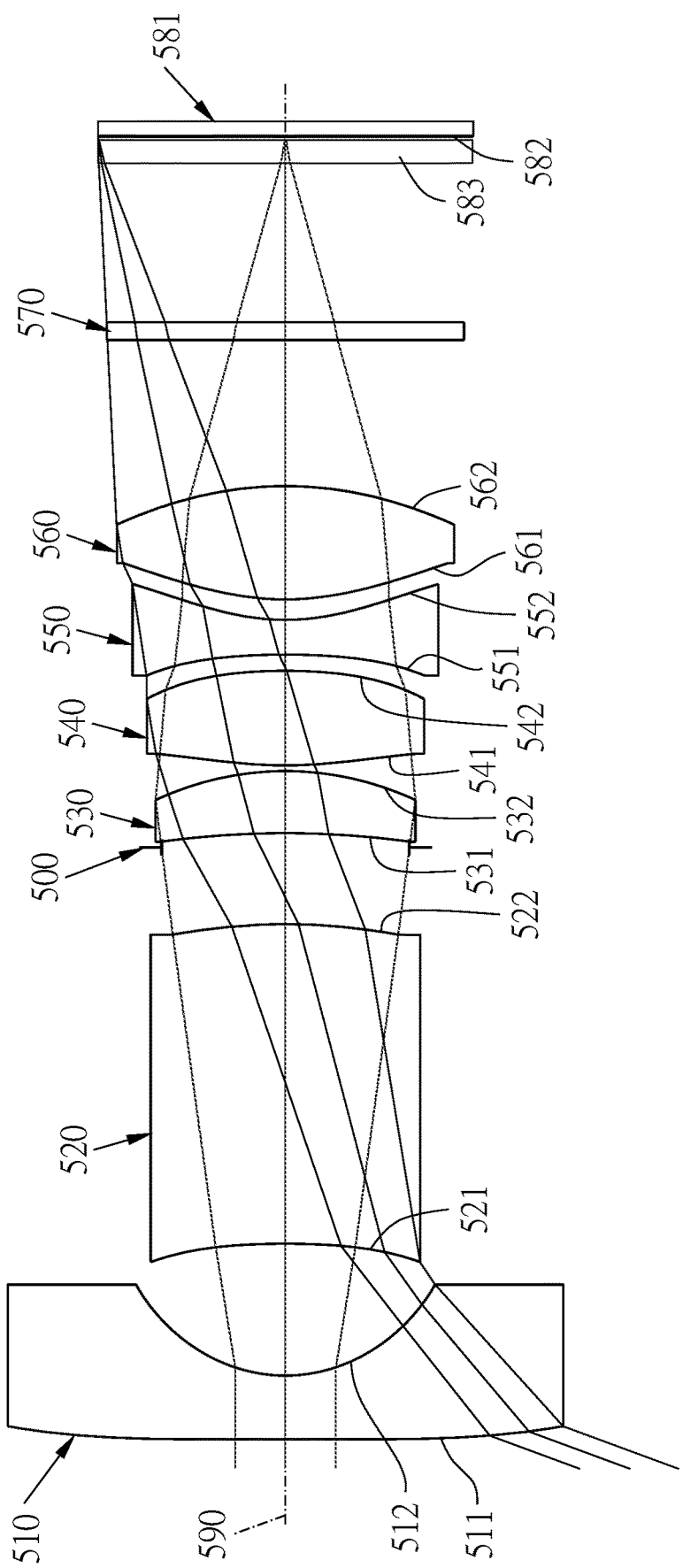
FIG. 5A is a schematic view of an optical lens assembly in accordance with a fifth embodiment of the present invention.
Figure 5B:
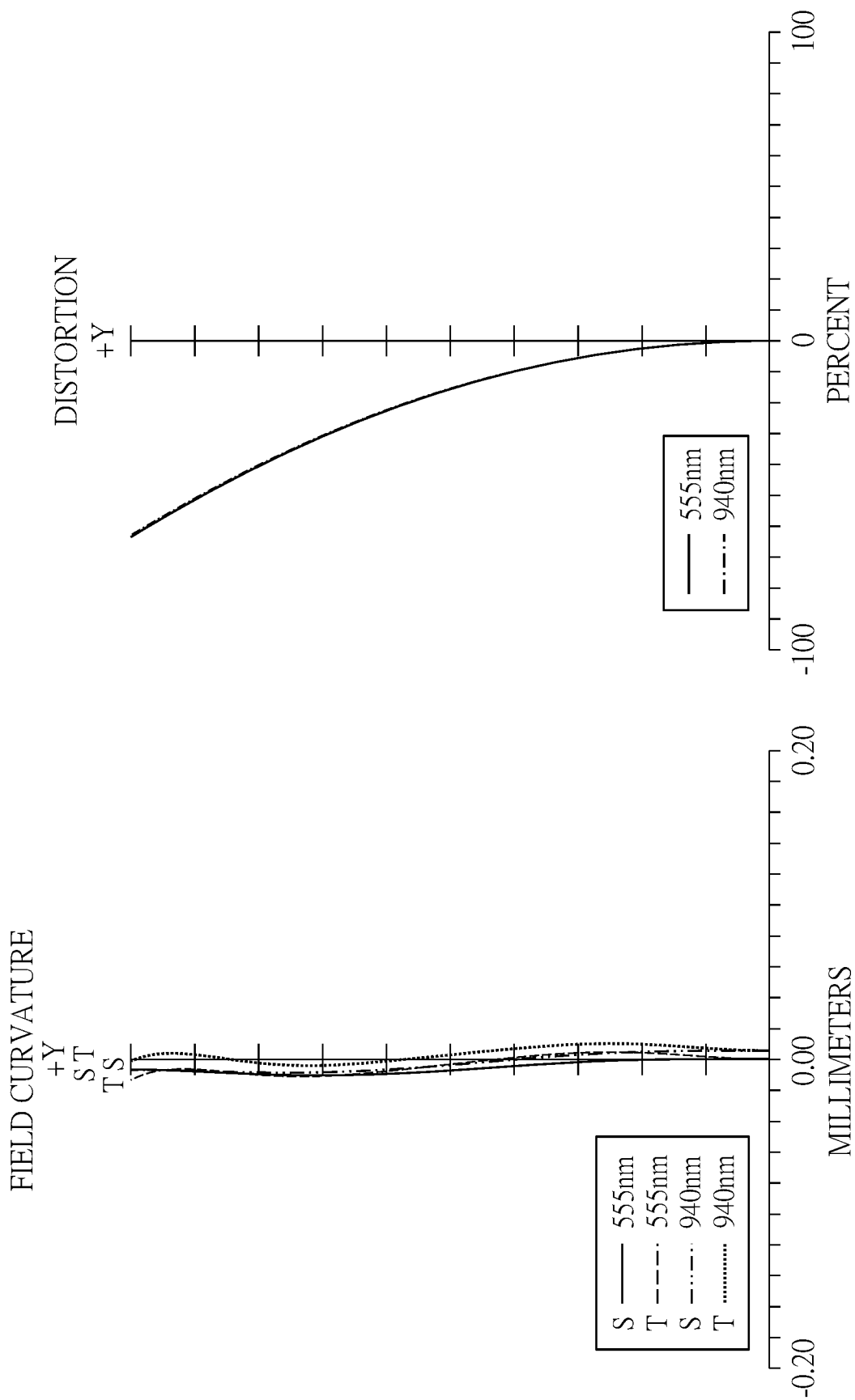
FIG. 5B is a schematic diagram showing, in order from left to right, the field curvature curve and the distortion curve of the fifth embodiment of the present invention, which illustrate the states of the field curvature curve and the distortion curve in both visible and infrared light bands.

Referring to FIGS. 5A and 5B, FIG. 5A shows a schematic view of an optical lens assembly in accordance with a fifth embodiment of the present invention, FIG. 5B shows, in order from left to right, the field curvature curve and the distortion curve of the fifth embodiment of the present invention, which illustrate the states of the field curvature curve and the distortion curve in both visible and infrared light bands. As shown in FIG. 5A, the optical lens assembly includes, in order from an object side to an image side along an optical axis 590: a first lens 510, a second lens 520, a stop 500, a third lens 530, a fourth lens 540, a fifth lens 550, a sixth lens 560, an optical filter 570, and an image plane 582. The optical lens assembly can cooperate with an image sensor 581 disposed on an image plane 582. The optical lens assembly has a total of six lenses with refractive power, but not is limited thereto.

The first lens 510 with negative refractive power includes an object-side surface 511 and an image-side surface 512, the object-side surface 511 of the first lens 510 is concave in a paraxial region thereof, the image-side surface 512 of the first lens 510 is concave in a paraxial region thereof, the object-side surface 511 and the image-side surface 512 of the first lens 510 are aspheric, and the first lens 510 is made of plastic.

The second lens 520 with positive refractive power includes an object-side surface 521 and an image-side surface 522, the object-side surface 521 of the second lens 520 is concave in a paraxial region thereof, the image-side surface 522 of the second lens 520 is convex in a paraxial region thereof, the object-side surface 521 and the image-side surface 522 of the second lens 520 are aspheric, and the second lens 520 is made of plastic.

The third lens 530 with positive refractive power includes an object-side surface 531 and an image-side surface 532, the object-side surface 531 of the third lens 530 is concave in a paraxial region thereof, the image-side surface 532 of the third lens 530 is convex in a paraxial region thereof, the object-side surface 531 and the image-side surface 532 of the third lens 530 are aspheric, and the third lens 530 is made of glass.

The fourth lens 540 with positive refractive power includes an object-side surface 541 and an image-side surface 542, the object-side surface 541 of the fourth lens 540 is convex in a paraxial region thereof, the image-side surface 542 of the fourth lens 540 is convex in a paraxial region thereof, the object-side surface 541 and the image-side surface 542 of the fourth lens 540 are aspheric, and the fourth lens 540 is made of plastic.

The fifth lens 550 with negative refractive power includes an object-side surface 551 and an image-side surface 552, the object-side surface 551 of the fifth lens 550 is concave in a paraxial region thereof, the image-side surface 552 of the fifth lens 550 is concave in a paraxial region thereof, the object-side surface 551 and the image-side surface 552 of the fifth lens 550 are aspheric, and the fifth lens 550 is made of plastic.

The sixth lens 560 with positive refractive power includes an object-side surface 561 and an image-side surface 562, the object-side surface 561 of the sixth lens 560 is convex in a paraxial region thereof, the image-side surface 562 of the sixth lens 560 is convex in a paraxial region thereof, the object-side surface 561 and the image-side surface 562 of the sixth lens 560 are aspheric, and the sixth lens 560 is made of plastic.

The optical filter 570 is made of glass, is located between the sixth lens 560 and the image plane 582, and has no influence on the focal length of the optical lens assembly. In the present embodiment, the optical filter 570 is selected from filters that allow light in the visible light wavelengths, in the infrared light wavelengths or in both the visible and infrared light wavelengths to pass therethrough.

The cover glass 583 is made of glass, is disposed between the optical filter 570 and the image plane 582, and has no influence on the focal length of the optical lens assembly.

The detailed optical data of the respective elements in the optical lens assembly of the fifth embodiment is shown in Table 9, and the aspheric coefficients of the lenses in the fifth embodiment is shown in Table 10.

TABLE 9

Embodiment 5
f = 3.21 mm, Fno = 1.60, FOV = 142.4°

| Surface | | Radius of curvature | | Thickness/ gap | Material | Refractive index (nd) | Abbe number (vd) | Focal length |
|---|---|---|---|---|---|---|---|---|
| 0 | Object | Infinity | | Infinity | | | | |
| 1 | First lens | −407.803 | (ASP) | 1.080 | plastic | 1.544 | 56.0 | −5.65 |
| 2 | | 3.112 | (ASP) | 2.233 | | | | |
| 3 | Second lens | −15.396 | (ASP) | 5.412 | plastic | 1.661 | 20.4 | 41.88 |
| 4 | | −11.323 | (ASP) | 1.293 | | | | |
| 5 | Stop | Infinity | | 0.245 | | | | |
| 6 | Third lens | −17.702 | | 1.051 | glass | 1.804 | 46.6 | 10.70 |

TABLE 9-continued

Embodiment 5
f = 3.21 mm, Fno = 1.60, FOV = 142.4°

| Surface | | Radius of curvature | | Thickness/gap | Material | Refractive index (nd) | Abbe number (vd) | Focal length |
|---|---|---|---|---|---|---|---|---|
| 7 | | −5.959 | | 0.091 | | | | |
| 8 | Fourth lens | 9.246 | (ASP) | 1.596 | plastic | 1.544 | 56.0 | 9.50 |
| 9 | | −11.111 | (ASP) | 0.276 | | | | |
| 10 | Fifth lens | −14.541 | (ASP) | 0.588 | plastic | 1.661 | 20.4 | −5.08 |
| 11 | | 4.491 | (ASP) | 0.347 | | | | |
| 12 | Sixth lens | 5.390 | (ASP) | 1.920 | plastic | 1.544 | 56.0 | 6.03 |
| 13 | | −7.400 | (ASP) | 2.470 | | | | |
| 14 | Optical filter | Infinity | | 0.300 | glass | 1.517 | 64.2 | |
| 15 | | Infinity | | 2.693 | | | | |
| 16 | Cover glass | Infinity | | 0.400 | glass | 1.517 | 64.2 | |
| 17 | | Infinity | | 0.045 | | | | |
| 18 | Image plane | Infinity | | — | | | | |

TABLE 10

Aspheric Coefficients

| Surface | 1 | 2 | 3 | 4 | 6 | 7 |
|---|---|---|---|---|---|---|
| K | 0.0000E+00 | 0.0000E+00 | 1.6519E+01 | 2.9262E+00 | 0.0000E+00 | 0.0000E+00 |
| A2: | 0.0000E+00 | 0.0000E+00 | 0.0000E+00 | 0.0000E+00 | 0.0000E+00 | 0.0000E+00 |
| A4: | 4.3544E−04 | −9.2047E−04 | −2.3810E−03 | −1.9569E−05 | 0.0000E+00 | 0.0000E+00 |
| A6: | −1.9076E−06 | −1.1352E−04 | 6.0713E−06 | 1.6928E−04 | 0.0000E+00 | 0.0000E+00 |
| A8: | −5.9526E−08 | 1.0546E−05 | −2.3650E−06 | −4.9663E−06 | 0.0000E+00 | 0.0000E+00 |
| A10: | 1.5614E−09 | −1.5084E−06 | 6.1320E−07 | 2.3963E−07 | 0.0000E+00 | 0.0000E+00 |
| A12: | −3.8975E−13 | 4.0731E−08 | −3.3879E−08 | 8.9991E−08 | 0.0000E+00 | 0.0000E+00 |
| A14: | 1.0154E−13 | −2.8417E−09 | −6.7117E−10 | −6.7792E−09 | 0.0000E+00 | 0.0000E+00 |
| A16: | 0.0000E+00 | 0.0000E+00 | 0.0000E+00 | 0.0000E+00 | 0.0000E+00 | 0.0000E+00 |
| A18: | 0.0000E+00 | 0.0000E+00 | 0.0000E+00 | 0.0000E+00 | 0.0000E+00 | 0.0000E+00 |
| A20: | 0.0000E+00 | 0.0000E+00 | 0.0000E+00 | 0.0000E+00 | 0.0000E+00 | 0.0000E+00 |

| Surface | 8 | 9 | 10 | 11 | 12 | 13 |
|---|---|---|---|---|---|---|
| K: | 0.0000E+00 | 0.0000E+00 | 0.0000E+00 | 0.0000E+00 | −5.9049E−02 | 3.6509E−01 |
| A2: | 0.0000E+00 | 0.0000E+00 | 0.0000E+00 | 0.0000E+00 | 0.0000E+00 | 0.0000E+00 |
| A4: | −3.8089E−03 | −4.8614E−03 | −2.6389E−03 | −6.7623E−03 | −5.1373E−03 | 4.9444E−04 |
| A6: | 4.1005E−05 | 1.2342E−04 | −1.2709E−04 | 1.9948E−04 | 2.7971E−04 | −6.2153E−05 |
| A8: | 2.4196E−06 | 4.3950E−06 | 2.0894E−05 | −5.0628E−06 | −4.9268E−06 | 8.8055E−06 |
| A10: | −7.2068E−07 | −1.0506E−06 | −1.2821E−06 | −8.6227E−07 | −5.0141E−07 | −1.0789E−07 |
| A12: | −1.7121E−08 | −3.1361E−08 | −3.4092E−08 | −2.7022E−08 | −1.0925E−08 | 2.5324E−10 |
| A14: | 2.5238E−10 | −1.7309E−09 | −7.1154E−09 | −3.0898E−10 | −1.4492E−09 | −1.4938E−09 |
| A16: | 0.0000E+00 | 0.0000E+00 | 0.0000E+00 | 0.0000E+00 | 0.0000E+00 | 0.0000E+00 |
| A18: | 0.0000E+00 | 0.0000E+00 | 0.0000E+00 | 0.0000E+00 | 0.0000E+00 | 0.0000E+00 |
| A20: | 0.0000E+00 | 0.0000E+00 | 0.0000E+00 | 0.0000E+00 | 0.0000E+00 | 0.0000E+00 |

In the fifth embodiment, the curve equation of the aspheric surface profiles of the aforementioned lenses is the same as the curve equation of the first embodiment. Also, the definitions of these parameters shown in the following table are the same as those stated in the first embodiment, so an explanation in this regard will not be provided again.

These parameters can be calculated from Table 9 and Table 10 as the following values, and the following conditions in the following table are satisfied.

| Embodiment 5 | | | |
|---|---|---|---|
| f[mm] | 3.21 | TL/(IMH*f)[mm$^{-1}$] | 1.99 |
| EPD[mm] | 1.97 | FOV/CRA | 11.10 |
| Fno | 1.60 | f2/f3 | 3.91 |
| FOV[°] | 142.4 | (R8/R9)/T45[mm$^{-1}$] | 2.76 |
| f/f1 | −0.57 | R10/R11 | 0.83 |
| R5/R6 | 2.97 | (CT4 + CT6)/(CT5*f5)[mm$^{-1}$] | −1.18 |

-continued

| Embodiment 5 | | | |
|---|---|---|---|
| f4/f5 | −1.87 | f5*f6/f[mm] | −9.53 |
| (R5*R6)/(f3*CT3) | 9.38 | tan(CRA)*BFL/IMH | 0.39 |
| f6/R11 | 1.12 | CRA(BFL*f)[°/mm$^2$] | 0.68 |
| f4*R8/(R9*f5) | −1.43 | vd3/(nd3*f3*CT3)[mm$^{-2}$] | 2.30 |
| (TL-BFL)/IMH | 4.68 | | |

Sixth Embodiment

Figure 6A:
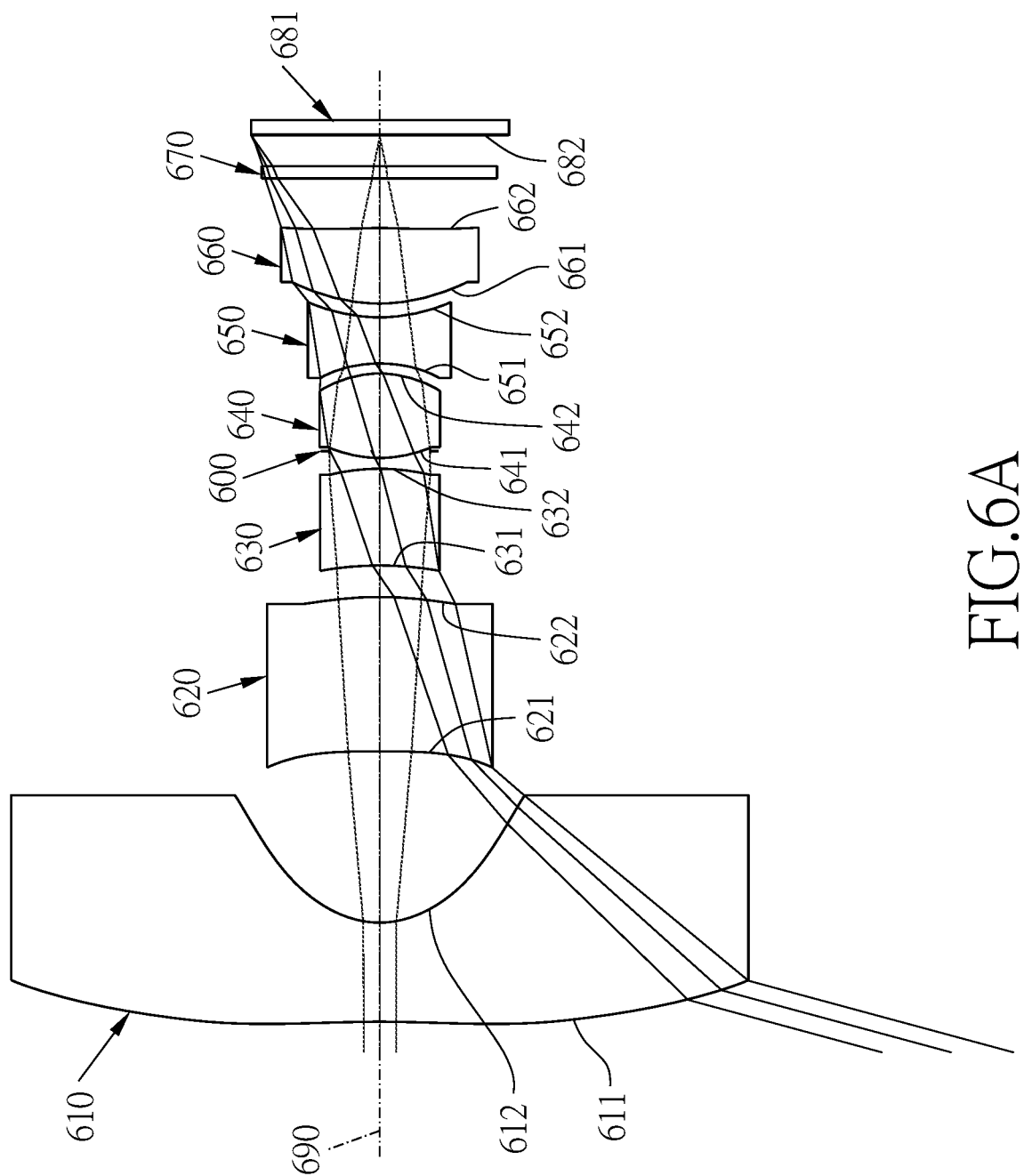
FIG. 6A is a schematic view of an optical lens assembly in accordance with a sixth embodiment of the present invention.
Figure 6B:
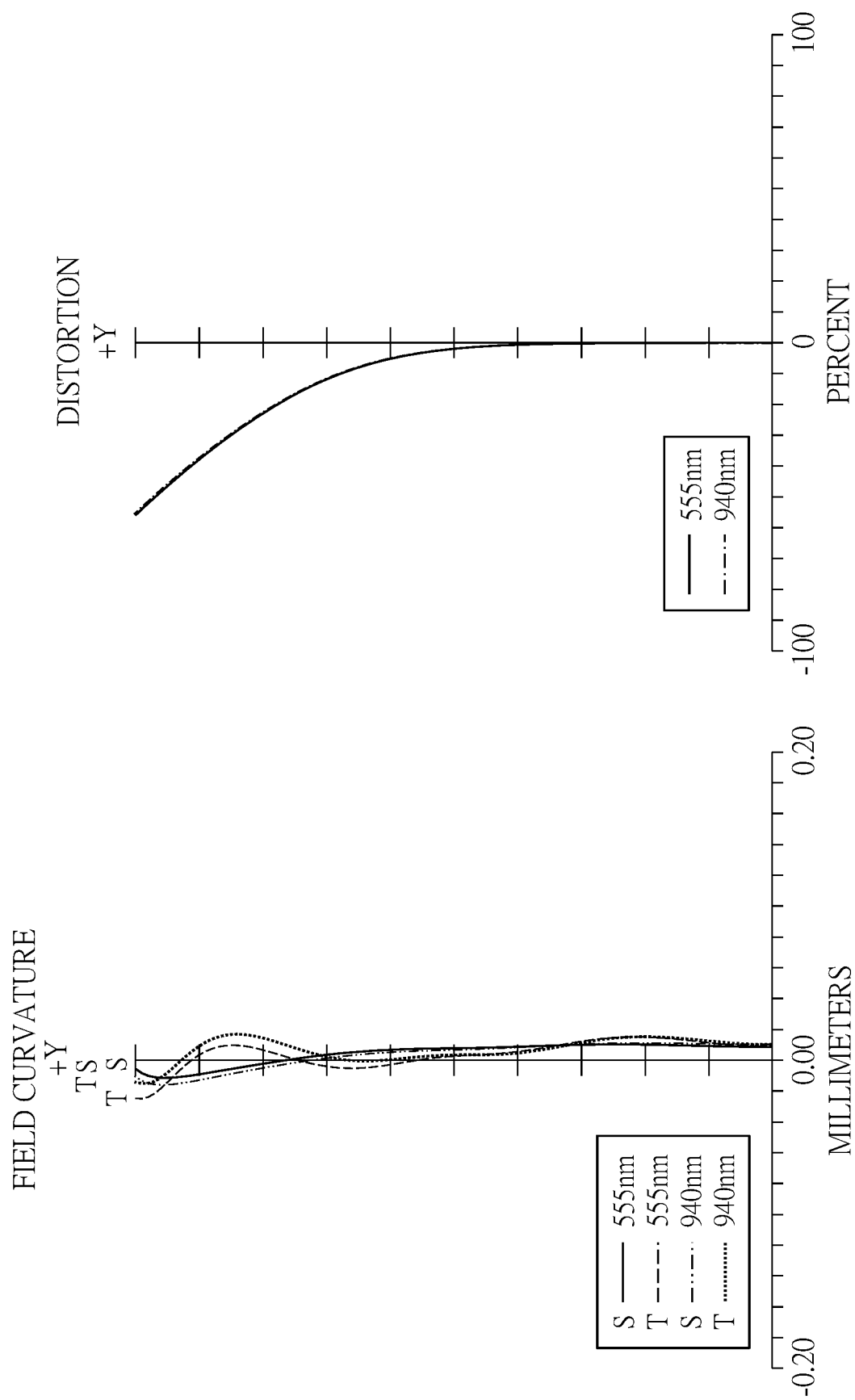
FIG. 6B is a schematic diagram showing, in order from left to right, the field curvature curve and the distortion curve of the sixth embodiment of the present invention, which illustrate the states of the field curvature curve and the distortion curve in both visible and infrared light bands.

Referring to FIGS. 6A and 6B, FIG. 6A shows a schematic view of an optical lens assembly in accordance with a sixth embodiment of the present invention, FIG. 6B shows, in order from left to right, the field curvature curve and the distortion curve of the sixth embodiment of the present invention, which illustrate the states of the field curvature curve and the distortion curve in both visible and infrared light bands. As shown in FIG. 6A, the optical lens assembly includes, in order from an object side to an image side along an optical axis 690: a first lens 610, a second lens 620, a stop 600, a third lens 630, a fourth lens 640, a fifth lens 650, a sixth lens 660, an optical filter 670, and an image plane 682. The optical lens assembly can cooperate with an image sensor 681 disposed on an image plane 682. The optical lens assembly has a total of six lenses with refractive power, but not is limited thereto.

The first lens 610 with negative refractive power includes an object-side surface 611 and an image-side surface 612, the object-side surface 611 of the first lens 610 is concave in a paraxial region thereof, the image-side surface 612 of the first lens 610 is concave in a paraxial region thereof, the object-side surface 611 and the image-side surface 612 of the first lens 610 are aspheric, and the first lens 610 is made of plastic.

The second lens 620 with positive refractive power includes an object-side surface 621 and an image-side surface 622, the object-side surface 621 of the second lens 620 is concave in a paraxial region thereof, the image-side surface 622 of the second lens 620 is convex in a paraxial region thereof, the object-side surface 621 and the image-side surface 622 of the second lens 620 are aspheric, and the second lens 620 is made of plastic.

The third lens 630 with positive refractive power includes an object-side surface 631 and an image-side surface 632, the object-side surface 631 of the third lens 630 is concave in a paraxial region thereof, the image-side surface 632 of the third lens 630 is convex in a paraxial region thereof, the object-side surface 631 and the image-side surface 632 of the third lens 630 are aspheric, and the third lens 630 is made of glass.

The fourth lens 640 with positive refractive power includes an object-side surface 641 and an image-side surface 642, the object-side surface 641 of the fourth lens 640 is convex in a paraxial region thereof, the image-side surface 642 of the fourth lens 640 is convex in a paraxial region thereof, the object-side surface 641 and the image-side surface 642 of the fourth lens 640 are aspheric, and the fourth lens 640 is made of plastic.

The fifth lens 650 with negative refractive power includes an object-side surface 651 and an image-side surface 652, the object-side surface 651 of the fifth lens 650 is concave in a paraxial region thereof, the image-side surface 652 of the fifth lens 650 is concave in a paraxial region thereof, the object-side surface 651 and the image-side surface 652 of the fifth lens 650 are aspheric, and the fifth lens 650 is made of plastic.

The sixth lens 660 with positive refractive power includes an object-side surface 661 and an image-side surface 662, the object-side surface 661 of the sixth lens 660 is convex in a paraxial region thereof, the image-side surface 662 of the sixth lens 660 is convex in a paraxial region thereof, the object-side surface 661 and the image-side surface 662 of the sixth lens 660 are aspheric, and the sixth lens 660 is made of plastic.

The optical filter 670 is made of glass, is located between the sixth lens 660 and the image plane 682, and has no influence on the focal length of the optical lens assembly. In the present embodiment, the optical filter 670 is selected from filters that allow light in the visible light wavelengths, in the infrared light wavelengths or in both the visible and infrared light wavelengths to pass therethrough.

The detailed optical data of the respective elements in the optical lens assembly of the sixth embodiment is shown in Table 11, and the aspheric coefficients of the lenses in the sixth embodiment is shown in Table 12.

TABLE 11

Embodiment 6
f = 1.31 mm, Fno = 2.20, FOV = 152.0°

| Surface | | Radius of curvature | | Thickness/gap | Material | Refractive index (nd) | Abbe number (vd) | Focal length |
|---|---|---|---|---|---|---|---|---|
| 0 | Object | Infinity | | Infinity | | | | |
| 1 | First lens | −25.078 | (ASP) | 1.641 | plastic | 1.544 | 56.0 | −3.05 |
| 2 | | 1.826 | (ASP) | 2.834 | | | | |
| 3 | Second lens | −37.026 | (ASP) | 2.561 | plastic | 1.643 | 22.5 | 13.42 |
| 4 | | −7.228 | (ASP) | 0.521 | | | | |
| 5 | Third lens | −5.811 | (ASP) | 1.595 | glass | 1.803 | 45.5 | 14.52 |
| 6 | | −4.360 | (ASP) | 0.295 | | | | |
| 7 | Stop | Infinity | | −0.113 | | | | |
| 8 | fourth lens | 2.544 | (ASP) | 1.395 | plastic | 1.544 | 56.0 | 2.37 |
| 9 | | −2.132 | (ASP) | 0.166 | | | | |
| 10 | Fifth lens | −2.980 | (ASP) | 0.766 | plastic | 1.671 | 19.2 | −2.06 |
| 11 | | 2.899 | (ASP) | 0.230 | | | | |
| 12 | Sixth lens | 3.300 | (ASP) | 1.251 | plastic | 1.544 | 56.0 | 4.51 |
| 13 | | −8.401 | (ASP) | 0.814 | | | | |
| 14 | Optical filter | Infinity | | 0.210 | glass | 1.517 | 64.2 | |
| 15 | | Infinity | | 0.500 | | | | |
| 16 | Image plane | Infinity | | — | | | | |

TABLE 12

Aspheric Coefficients

| Surface | 1 | 2 | 3 | 4 | 5 | 6 |
|---|---|---|---|---|---|---|
| K | 8.7265E+00 | −6.5690E−01 | 8.1274E+01 | 1.3481E+01 | −3.4551E−02 | 1.3036E−02 |
| A2: | 0.0000E+00 | 0.0000E+00 | 0.0000E+00 | 0.0000E+00 | 0.0000E+00 | 0.0000E+00 |
| A4: | 3.3043E−03 | −4.6951E−03 | −1.6510E−02 | 3.6290E−03 | 1.5172E−04 | −8.6829E−05 |

TABLE 12-continued

Aspheric Coefficients

| A6: | −1.5083E−04 | −7.2726E−04 | 2.7779E−03 | 6.8950E−03 | −1.2584E−04 | −3.6687E−05 |
|---|---|---|---|---|---|---|
| A8: | 4.0783E−06 | 1.1870E−03 | −1.2065E−03 | −7.0549E−03 | −1.1078E−05 | 1.8783E−04 |
| A10: | −6.0233E−08 | −3.0711E−04 | 2.6837E−04 | 5.6473E−03 | −1.1078E−05 | 1.5516E−04 |
| A12: | 4.5442E−10 | 2.9173E−05 | −2.1659E−05 | −2.0921E−03 | 0.0000E+00 | 0.0000E+00 |
| A14: | −1.2141E−12 | −1.1866E−06 | 4.6477E−07 | 3.2627E−04 | 0.0000E+00 | 0.0000E+00 |
| A16: | 0.0000E+00 | 0.0000E+00 | 0.0000E+00 | 0.0000E+00 | 0.0000E+00 | 0.0000E+00 |
| A18: | 0.0000E+00 | 0.0000E+00 | 0.0000E+00 | 0.0000E+00 | 0.0000E+00 | 0.0000E+00 |
| A20: | 0.0000E+00 | 0.0000E+00 | 0.0000E+00 | 0.0000E+00 | 0.0000E+00 | 0.0000E+00 |

| Surface | 8 | 9 | 10 | 11 | 12 | 13 |
|---|---|---|---|---|---|---|
| K | −4.9745E−01 | −8.2480E−02 | 1.0036E+00 | 3.0383E−01 | −4.5241E−01 | −8.8599E+01 |
| A2: | 0.0000E+00 | 0.0000E+00 | 0.0000E+00 | 0.0000E+00 | 0.0000E+00 | 0.0000E+00 |
| A4: | 3.7565E−04 | −3.4187E−02 | −9.6252E−02 | −8.9762E−02 | −1.6867E−02 | 4.2641E−02 |
| A6: | 1.1823E−02 | 1.5851E−01 | 1.9695E−01 | 1.1512E−01 | 9.1377E−03 | −1.8697E−02 |
| A8: | −6.5492E−02 | −3.3350E−01 | −1.4931E−01 | −1.1349E−01 | −1.2353E−02 | 9.9061E−03 |
| A10: | 5.5853E−02 | 7.8140E−01 | −6.3514E−02 | 1.6139E−01 | 2.4328E−02 | −1.4272E−02 |
| A12: | 2.9571E−01 | −1.6450E+00 | 1.0783E−01 | −2.3110E−01 | −2.4257E−02 | 1.2828E−02 |
| A14: | −8.7564E−01 | 2.1664E+00 | 2.9767E−02 | 2.0869E−01 | 1.3282E−02 | −6.1114E−03 |
| A16: | 9.7409E−01 | −1.6510E+00 | −1.1506E−01 | −1.0873E−01 | −4.2075E−03 | 1.6268E−03 |
| A18: | −4.9353E−01 | 6.7494E−01 | 7.9070E−02 | 3.0410E−02 | 7.2826E−04 | −2.3337E−04 |
| A20: | 9.4108E−02 | −1.1450E−01 | −1.8469E−02 | −3.5473E−03 | −5.3355E−05 | 1.4189E−05 |

In the sixth embodiment, the curve equation of the aspheric surface profiles of the aforementioned lenses is the same as the curve equation of the first embodiment. Also, the definitions of these parameters shown in the following table are the same as those stated in the first embodiment, so an explanation in this regard will not be provided again.

These parameters can be calculated from Table 11 and Table 12 as the following values, and the following conditions in the following table are satisfied.

| Embodiment 6 | | | |
|---|---|---|---|
| f[mm] | 1.31 | TL/(IMH*f)[mm$^{-1}$] | 4.86 |
| EPD[mm] | 0.58 | FOV/CRA | 5.28 |
| Fno | 2.20 | f2/f3 | 0.92 |
| FOV[°] | 152.0 | (R8/R9)/T45[mm$^{-1}$] | 4.30 |
| f/f1 | −0.43 | R10/R11 | 0.88 |
| R5/R6 | 1.33 | (CT4 + CT6)/(CT5*f5)[mm$^{-1}$] | −1.68 |
| f4/f5 | −1.15 | f5*f6/f[mm] | −7.11 |
| (R5*R6)/(f3*CT3) | 1.09 | tan(CRA)*BFL/IMH | 0.36 |
| f6/R11 | 1.37 | CRA/(BFL*f)[°/mm$^2$] | 14.44 |
| f4*R8/(R9*f5) | −0.82 | vd3/(nd3*f3*CT3)[mm$^{-2}$] | 1.09 |
| (TL-BFL)/IMH | 5.70 | | |

Seventh Embodiment

Figure 7:
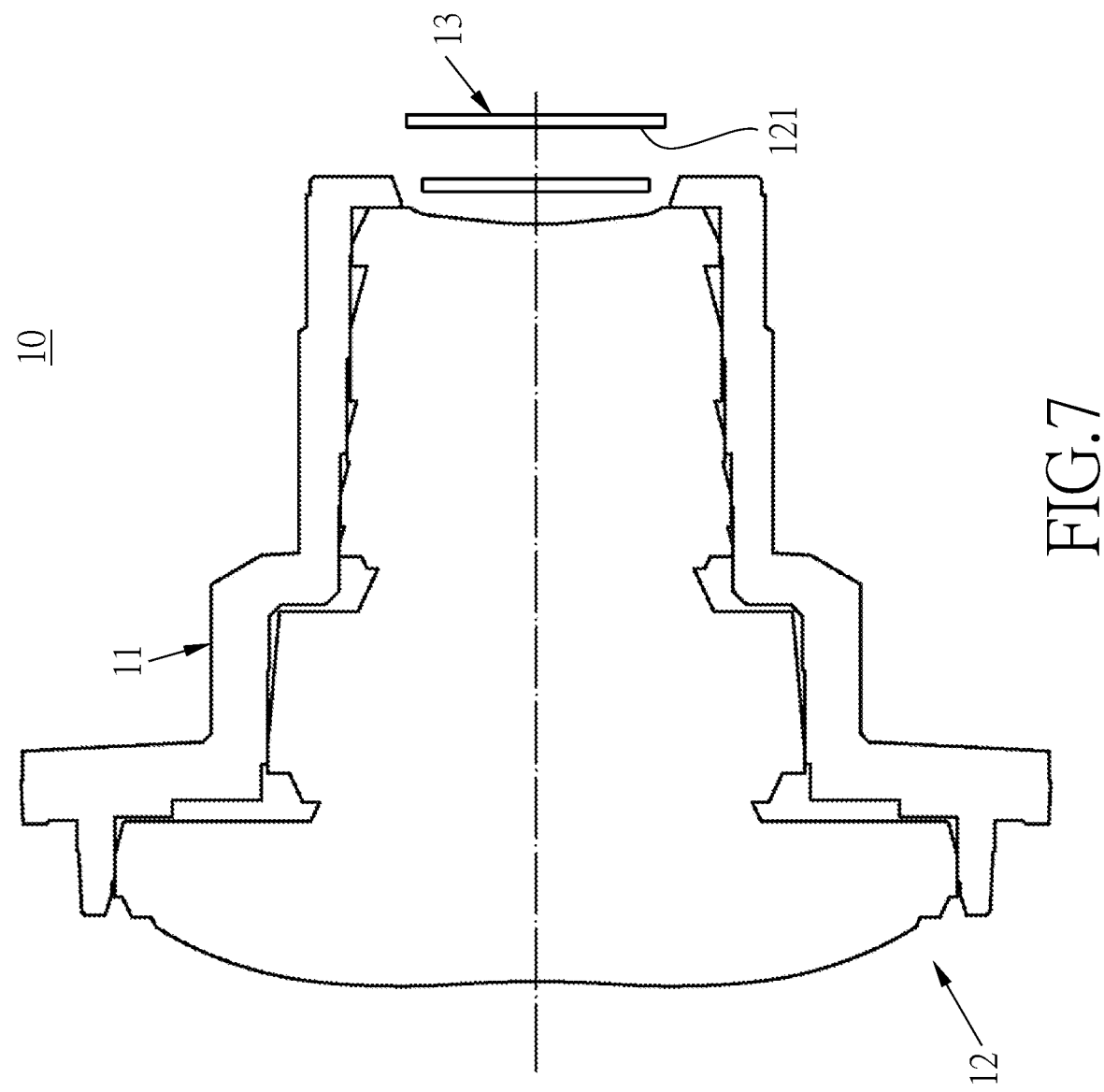
FIG. 7 is a schematic view of a photographing module in accordance with a seventh embodiment of the present invention.

Referring to FIG. 7, which shows a schematic view of a photographing module in accordance with a seventh embodiment of the present invention. The photographing module 10 includes a lens barrel 11, an optical lens assembly 12 and an image sensor 13. The optical lens assembly 12 is the optical lens assembly of any one of the above embodiments and is disposed in the lens barrel 11. The image sensor 13 is disposed on an image plane 121 of the optical lens assembly 12 and is an electronic image sensor (such as, CMOS or CCD) with good photosensitivity and low noise to really present the imaging quality of the optical lens assembly.

For the optical lens assembly in the present invention, the lenses can be made of plastic or glass. If the lens is made of plastic, it is conducive to reducing the manufacturing cost. If the lens is made of glass, it is conducive to enhancing the degree of freedom in the arrangement of refractive power of the optical lens assembly. Moreover, any of the object-side and image-side surfaces of a respective lens of the optical lens assembly can be aspheric, and the aspheric surface can have any profile shape other than the profile shape of a spherical surface, so more variables can be used in the design of aspheric surfaces (than spherical surfaces), which is conducive to reducing the aberration and the number of lenses, as well as the total length of the optical lens assembly.

In the optical lens assembly of the present invention, the optical filter is made of, but not limited to, glass and can be made of other materials with high Abbe numbers.

For the optical lens assembly in the present invention, if the surface shape of a respective lens surface of a respective lens with refractive power is convex and the location of the convex portion of the respective lens surface of the respective lens is not defined, the convex portion is typically located in a paraxial region of the respective lens surface of the respective lens. If the surface shape of a respective lens surface of a respective lens is concave and the location of the concave portion of the respective lens surface of the respective lens is not defined, the concave portion is typically located in a paraxial region of the respective lens surface of the respective lens.

The optical lens assembly of the present invention can be used in focus-adjustable optical systems according to the actual requirements and have good aberration correction ability and better image quality. The optical lens assembly of the present invention can also be used in electronic imaging systems, such as, 3D image capturing device, wearable display of virtual reality (VR) or augmented reality (AR), game player, surveillance camera, digital camera, mobile device, tablet computer, household electronic device or vehicle camera.

What is claimed is:
1. An optical lens assembly comprising, in order from an object side to an image side:
a first lens with negative refractive power, comprising an object-side surface and an image-side surface, the object-side surface of the first lens being concave in a paraxial region thereof, and the image-side surface of the first lens being concave in a paraxial region thereof;

a second lens with positive refractive power, comprising an object-side surface and an image-side surface, the object-side surface of the second lens being concave in a paraxial region thereof, and the image-side surface of the second lens being convex in a paraxial region thereof;

a third lens with positive refractive power, comprising an object-side surface and an image-side surface, the object-side surface of the third lens being concave in a paraxial region thereof, and the image-side surface of the third lens being convex in a paraxial region thereof;

a fourth lens with positive refractive power, comprising an object-side surface and an image-side surface, the object-side surface of the fourth lens being convex in a paraxial region thereof, and the image-side surface of the fourth lens being convex in a paraxial region thereof;

a fifth lens with negative refractive power, comprising an object-side surface and an image-side surface, the object-side surface of the fifth lens being concave in a paraxial region thereof, and the image-side surface of the fifth lens being concave in a paraxial region thereof; and a sixth lens with positive refractive power, comprising an object-side surface and an image-side surface, and the object-side surface of the sixth lens being convex in a paraxial region thereof;

wherein a chief ray angle incident on an image plane at a maximum view angle of the optical lens assembly is CRA, a distance from the image-side surface of the sixth lens to the image plane along an optical axis is BFL, a focal length of the optical lens assembly is f, and the following condition is satisfied:

$$0.54°/mm^2 < CRA/(BFL*f) < 17.33°/mm^2.$$

2. The optical lens assembly as claimed in claim 1, wherein a radius of curvature of the object-side surface of the third lens is R5, a radius of curvature of the image-side surface of the third lens is R6, and the following condition is satisfied:

$$1.07 < R5/R6 < 3.56.$$

3. The optical lens assembly as claimed in claim 1, wherein a radius of curvature of the object-side surface of the third lens is R5, a radius of curvature of the image-side surface of the third lens is R6, a focal length of the third lens is f3, a thickness of the third lens along the optical axis is CT3, and the following condition is satisfied:

$$0.88 < (R5*R6)/(f3*CT3) < 11.25.$$

4. The optical lens assembly as claimed in claim 1, wherein a focal length of the sixth lens is f6, a radius of curvature of the object-side surface of the sixth lens is R11, and the following condition is satisfied:

$$0.89 < f6/R11 < 4.35.$$

5. The optical lens assembly as claimed in claim 1, wherein a distance from the object-side surface of the first lens to the image plane along the optical axis is TL, the distance from the image-side surface of the sixth lens to the image plane along the optical axis is BFL, a maximum image height of the optical lens assembly is IMH, and the following condition is satisfied:

$$3.74 < (TL - BFL)/IMH < 6.84.$$

6. The optical lens assembly as claimed in claim 1, wherein a maximum field of view of the optical lens assembly is FOV, the chief ray angle incident on the image plane at the maximum view angle of the optical lens assembly is CRA, and the following condition is satisfied:

$$4.23 < FOV/CRA < 13.32.$$

7. The optical lens assembly as claimed in claim 1, wherein a radius of curvature of the image-side surface of the fifth lens is R10, a radius of curvature of the object-side surface of the sixth lens is R11, and the following condition is satisfied:

$$0.67 < R10/R11 < 7.20.$$

8. The optical lens assembly as claimed in claim 1, wherein the chief ray angle incident on the image plane at the maximum view angle of the optical lens assembly is CRA, the distance from the image-side surface of the sixth lens to the image plane along the optical axis is BFL, a maximum image height of the optical lens assembly is IMH, and the following condition is satisfied:

$$0.27 < \tan(CRA)*BFL/IMH < 0.47.$$

9. The optical lens assembly as claimed in claim 1, wherein an Abbe number of the third lens is vd3, a refractive index of the third lens is nd3, a focal length of the third lens is f3, a thickness of the third lens along the optical axis is CT3, and the following condition is satisfied:

$$0.87 \text{ mm}^{-2} < vd3/(nd3*f3*CT3) < 5.74 \text{ mm}^{-2}.$$

10. An optical lens assembly comprising, in order from an object side to an image side:

a first lens with negative refractive power, comprising an object-side surface and an image-side surface, the object-side surface of the first lens being concave in a paraxial region thereof, and the image-side surface of the first lens being concave in a paraxial region thereof;

a second lens with positive refractive power, comprising an object-side surface and an image-side surface, the object-side surface of the second lens being concave in a paraxial region thereof, and the image-side surface of the second lens being convex in a paraxial region thereof;

a third lens with positive refractive power, comprising an object-side surface and an image-side surface, the object-side surface of the third lens being concave in a paraxial region thereof, the image-side surface of the third lens being convex in a paraxial region thereof, and the third lens being made of glass;

a fourth lens with positive refractive power, comprising an object-side surface and an image-side surface, the object-side surface of the fourth lens being convex in a paraxial region thereof, and the image-side surface of the fourth lens being convex in a paraxial region thereof;

a fifth lens with negative refractive power, comprising an object-side surface and an image-side surface, the object-side surface of the fifth lens being concave in a paraxial region thereof, and the image-side surface of the fifth lens being concave in a paraxial region thereof; and a sixth lens with positive refractive power, comprising an object-side surface and an image-side surface, the object-side surface of the sixth lens being convex in a paraxial region thereof, and the image-side surface of the sixth lens being concave in a paraxial region thereof;

wherein the optical lens assembly comprising a stop disposed between the second lens and the fourth lens, a chief ray angle incident on an image plane at a maximum view angle of the optical lens assembly is CRA, a distance from the image-side surface of the sixth lens to the image plane along an optical axis is BFL, a focal length of the optical lens assembly is f, and the following condition is satisfied:

$$8.85°/mm^2 < CRA/(BFL*f) < 13.88°/mm^2.$$

11. The optical lens assembly as claimed in claim 10, wherein a radius of curvature of the object-side surface of the third lens is R5, a radius of curvature of the image-side surface of the third lens is R6, a focal length of the third lens is f3, a thickness of the third lens along the optical axis is CT3, and the following condition is satisfied:

$$2.24 < (R5*R6)/(f3*CT3) < 9.17.$$

12. The optical lens assembly as claimed in claim 10, wherein a focal length of the sixth lens is f6, a radius of curvature of the object-side surface of the sixth lens is R11, and the following condition is satisfied:

$$1.68 < f6/R11 < 4.35.$$

13. The optical lens assembly as claimed in claim 10, wherein a maximum field of view of the optical lens assembly is FOV, the chief ray angle incident on the image plane at the maximum view angle of the optical lens assembly is CRA, and the following condition is satisfied:

$$4.23 < FOV/CRA < 6.36.$$

14. The optical lens assembly as claimed in claim 10, wherein an Abbe number of the third lens is vd3, a refractive index of the third lens is nd3, a focal length of the third lens is f3, a thickness of the third lens along the optical axis is CT3, and the following condition is satisfied:

$$1.61\ mm^{-2} < vd3/(nd3*f3*CT3) < 4.02\ mm^{-2}.$$

15. A photographing module, comprising:

a lens barrel;

an optical lens assembly disposed in the lens barrel; and an image sensor disposed on an image plane of the optical lens assembly;

wherein the optical lens assembly comprising, in order from an object side to an image side:

a first lens with negative refractive power, comprising an object-side surface and an image-side surface, the object-side surface of the first lens being concave in a paraxial region thereof, and the image-side surface of the first lens being concave in a paraxial region thereof;

a second lens with positive refractive power, comprising an object-side surface and an image-side surface, the object-side surface of the second lens being concave in a paraxial region thereof, and the image-side surface of the second lens being convex in a paraxial region thereof;

a third lens with positive refractive power, comprising an object-side surface and an image-side surface, the object-side surface of the third lens being concave in a paraxial region thereof, and the image-side surface of the third lens being convex in a paraxial region thereof;

a fourth lens with positive refractive power, comprising an object-side surface and an image-side surface, the object-side surface of the fourth lens being convex in a paraxial region thereof, and the image-side surface of the fourth lens being convex in a paraxial region thereof;

a fifth lens with negative refractive power, comprising an object-side surface and an image-side surface, the object-side surface of the fifth lens being concave in a paraxial region thereof, and the image-side surface of the fifth lens being concave in a paraxial region thereof; and a sixth lens with positive refractive power, comprising an object-side surface and an image-side surface, and the object-side surface of the sixth lens being convex in a paraxial region thereof;

wherein a chief ray angle incident on an image plane at a maximum view angle of the optical lens assembly is CRA, a distance from the image-side surface of the sixth lens to the image plane along an optical axis is BFL, a focal length of the optical lens assembly is f, and the following condition is satisfied:

$$0.54°/mm^2 < CRA/(BFL*f) < 17.33°/mm^2.$$

16. The photographing module as claimed in claim 15, wherein a radius of curvature of the object-side surface of the third lens is R5, a radius of curvature of the image-side surface of the third lens is R6, a focal length of the third lens is f3, a thickness of the third lens along the optical axis is CT3, and the following condition is satisfied:

$$0.88 < (R5*R6)/(f3*CT3) < 11.25.$$

17. The photographing module as claimed in claim 15, wherein a focal length of the sixth lens is f6, a radius of curvature of the object-side surface of the sixth lens is R11, and the following condition is satisfied:

$$0.89 < f6/R11 < 4.35.$$

18. The photographing module as claimed in claim 15, wherein a maximum field of view of the optical lens assembly is FOV, the chief ray angle incident on the image plane at the maximum view angle of the optical lens assembly is CRA, and the following condition is satisfied:

$$4.23 < FOV/CRA < 13.32.$$

19. The photographing module as claimed in claim 15, wherein a radius of curvature of the image-side surface of the fifth lens is R10, a radius of curvature of the object-side surface of the sixth lens is R11, and the following condition is satisfied:

$$0.67 < R10/R11 < 7.20.$$

20. The photographing module as claimed in claim 15, wherein an Abbe number of the third lens is vd3, a refractive index of the third lens is nd3, a focal length of the third lens is f3, a thickness of the third lens along the optical axis is CT3, and the following condition is satisfied:

$$0.87 \text{ mm}^{-2} < vd3/(nd3*f3*CT3) < 5.74 \text{ mm}^{-2}.$$

\* \* \* \* \*